(12) United States Patent
Noguchi

(10) Patent No.: US 7,689,109 B2
(45) Date of Patent: Mar. 30, 2010

(54) OPTICAL IMAGE STABILIZER AND OPTICAL APPARATUS

(75) Inventor: Kazuhiro Noguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 12/014,987

(22) Filed: Jan. 16, 2008

(65) Prior Publication Data

US 2008/0181594 A1    Jul. 31, 2008

(30) Foreign Application Priority Data

Jan. 26, 2007  (JP)  ............... 2007-017032

(51) Int. Cl.
G03B 17/02 (2006.01)
H04N 5/228 (2006.01)
G02B 27/64 (2006.01)

(52) U.S. Cl. ................. 396/55; 348/208.7; 348/208.11; 359/557

(58) Field of Classification Search ............... 396/55, 396/52; 348/208.99, 208.2, 208.4, 208.7, 348/208.11; 359/554, 557
See application file for complete search history.

(56) References Cited

U.S. PATENT DOCUMENTS 5,926,656 A * 7/1999 Imura et al. ............ 396/55
6,035,131 A * 3/2000 Washisu ............ 396/55
6,064,827 A * 5/2000 Toyoda ............ 396/55
2003/0184878 A1* 10/2003 Tsuzuki ............ 359/694

FOREIGN PATENT DOCUMENTS

| JP | 10-197911 | 7/1998 |
| JP | 11-258651 | 9/1999 |
| JP | 2004-101721 | 4/2004 |

* cited by examiner

Primary Examiner—Rochelle-Ann J Blackman
(74) Attorney, Agent, or Firm—Cowan, Liebowitz & Latman, P.C.

(57) ABSTRACT

An optical image stabilizer includes a lens-holding member, first and second actuators driving the lens-holding member in first and second directions, a first guide member fixed to a base member, a second guide member placed between the first guide member and the lens-holding member, and a first ball placed between the base member and the lens-holding member and rolling in association with movement of the lens-holding member. Relative movement of the first and second guide members in a third direction accompanied by rolling of a second ball is allowed and relative movement thereof in a direction different from the third direction is limited by the second ball. Relative movement of the second guide member and the lens-holding member in a fourth direction accompanied by rolling of the third ball is allowed and relative movement thereof in a direction different from the fourth direction is limited by the third ball.

8 Claims, 19 Drawing Sheets

OPTICAL IMAGE STABILIZER AND OPTICAL APPARATUS

BACKGROUND OF THE INVENTION

The present invention relates to an optical image stabilizer provided in optical apparatuses including an image-pickup apparatus such as a video camera, a digital still camera and a film camera, and observation apparatuses such as a binocular, a telescope, and a fieldscope.

Optical apparatuses of the abovementioned type are often equipped with an optical image stabilizer for reducing image shake due to hand jiggling. The optical image stabilizer detects movements of the optical apparatus with a vibration sensor such as an acceleration sensor and an angular velocity sensor and moves a correction lens in a plane orthogonal to an optical axis based on the detection result, thereby reducing displacements of an image on an image plane. The correction lens is generally driven by using an electromagnetic actuator formed of a magnet and a coil.

In the optical image stabilizer, it is necessary that the correction lens should be held to be freely moved in parallel with the plane orthogonal to the optical axis and should be prevented from rotating about the optical axis in order to accurately perform driving and position control with the actuator.

An optical image stabilizer disclosed in Japanese Patent Laid-Open No. 11(1999)-258651 includes a guide mechanism for preventing the rotation of the correction lens about the optical axis. In addition, any backlash of the guide mechanism is reduced through biasing by a spring to minimize vibrations in image-shake correction operation and reduce noise in driving.

Japanese Patent Laid-Open No. 10(1998)-197911 has disclosed an optical image stabilizer that prevents the rotation of the correction lens about the optical axis by using an L-shaped guide shaft. The guide shaft guides the correction lens in a direction at an angle of 45 degrees with respect to the direction of driving by the actuator.

In each of the optical image stabilizers disclosed in Japanese Patent Laid-Open No. 11(1999)-258651 and No. 10(1998)-197911, the guide mechanism for preventing the rotation of the correction lens about the optical axis causes the correction lens to move in parallel through sliding. This presents a problem in which sliding friction produced in the guide mechanism reduces driving responsivity especially when the correction lens is driven slightly.

To address this, Japanese Patent Laid-Open No. 2004-101721 has disclosed an optical image stabilizer that prevents the rotation of the correction lens about the optical axis by using a ball that can be rolled. The stabilizer includes a guide member that has V-shaped groove portions formed in both surfaces thereof and extending in directions orthogonal to each other. The stabilizer also has a ball (steel ball) placed in the V-shaped groove portion in one of the surfaces of the guide member and sandwiched between the groove portion and a base member of the stabilizer and a ball placed in the V-shaped groove portion in the other of the surfaces and sandwiched between the groove portion and a lens-holding member for holding the correction lens.

In the optical image stabilizer disclosed in Japanese Patent Laid-Open No. 2004-101721, the surfaces of the guide member have the V-shaped groove portions formed therein, while the surfaces of the base member and the lens-holding member in contact with the balls are formed as flat surfaces. Since rolling friction of the balls is smaller than sliding friction, the balls are rolled without sliding on the flat surfaces in contact therewith when small shakes or low-frequency shakes are applied to the stabilizer. This can favorably prevent the rotation of the correction lens about the optical axis and reduction in driving responsivity due to the sliding friction.

However, when large-amplitude shakes or high-frequency shakes are applied or a large external force (torque) in the rotation direction is applied to the stabilizer, the balls are slid on the surfaces in contact therewith, and rotation of the correction lens about the optical axis is not prevented.

BRIEF SUMMARY OF THE INVENTION

The present invention provides an optical image stabilizer that can favorably prevent the rotation of the correction lens about the optical axis and can guide the correction lens with reduced frictional resistance even when large vibrations, high-frequency vibrations, or a large external force is applied, and an optical apparatus including the optical image stabilizer.

According to an aspect, the present invention provides an optical image stabilizer including a base member,
a lens-holding member holding a lens and is movable in a plane orthogonal to an optical axis of the lens with respect to the base member, a first actuator providing the lens-holding member with a driving force in a first direction, a second actuator providing the lens-holding member with a driving force in a second direction, the first and second directions being orthogonal to the optical axis, a first guide member fixed to the base member in a direction orthogonal to the optical axis, a second guide member placed between the first guide member and the lens-holding member and movable in a direction orthogonal to the optical axis with respect to the base member, a first ball placed between the base member and the lens-holding member and rolling in association with movement of the lens-holding member in the plane orthogonal to the optical axis with respect to the base member, a second ball placed between the first guide member and the second guide member, and
a third ball placed between the second guide member and the lens-holding member. Each of the first guide member and the second guide member includes a first limit portion that contacts the second ball such that relative movement of the first and second guide members in a third direction orthogonal to the optical axis accompanied by rolling of the second ball is allowed and that relative movement thereof in a direction different from the third direction is limited by the second ball. Each of the second guide member and the lens-holding member includes a second limit portion that contacts the third ball such that relative movement of the second guide member and the lens-holding member in a fourth direction orthogonal to the optical axis accompanied by rolling of the third ball is allowed and that relative movement thereof in a direction different from the fourth direction is limited by the third ball.

According to another aspect, the present invention provides an optical apparatus including the abovementioned optical image stabilizer.

Other aspects of the present invention will be apparent from the embodiments described below with reference to the drawings.

DETAILED DESCRIPTION OF THE PREFERRED EMBODIMENTS

Exemplary embodiments of the present invention will be described below with reference to the accompanied drawings.

Embodiment 1

Figure 2:
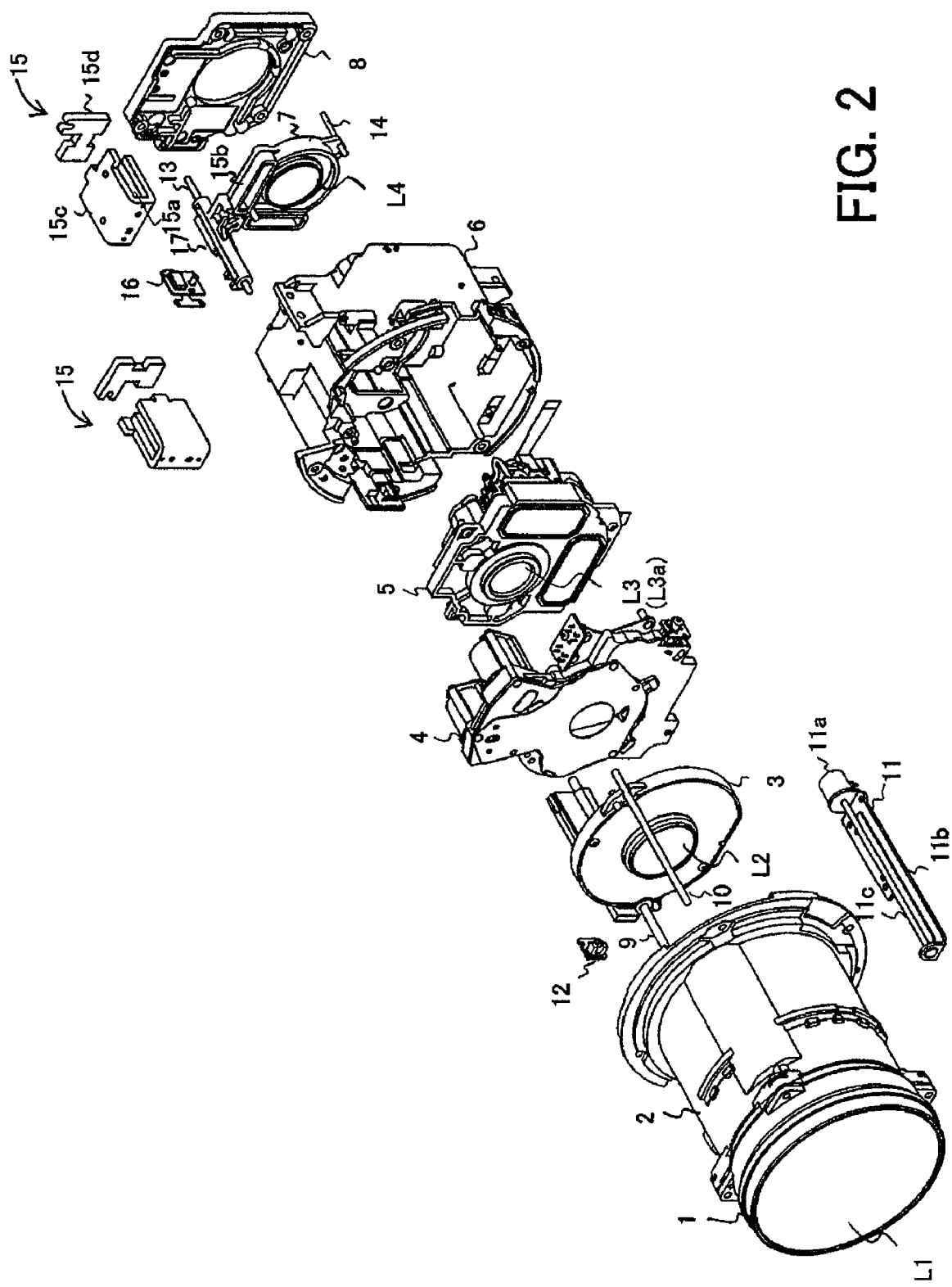
FIG. 2 is an exploded perspective view showing a lens apparatus on which the image-stabilization unit of Embodiment 1 is mounted.
Figure 3:
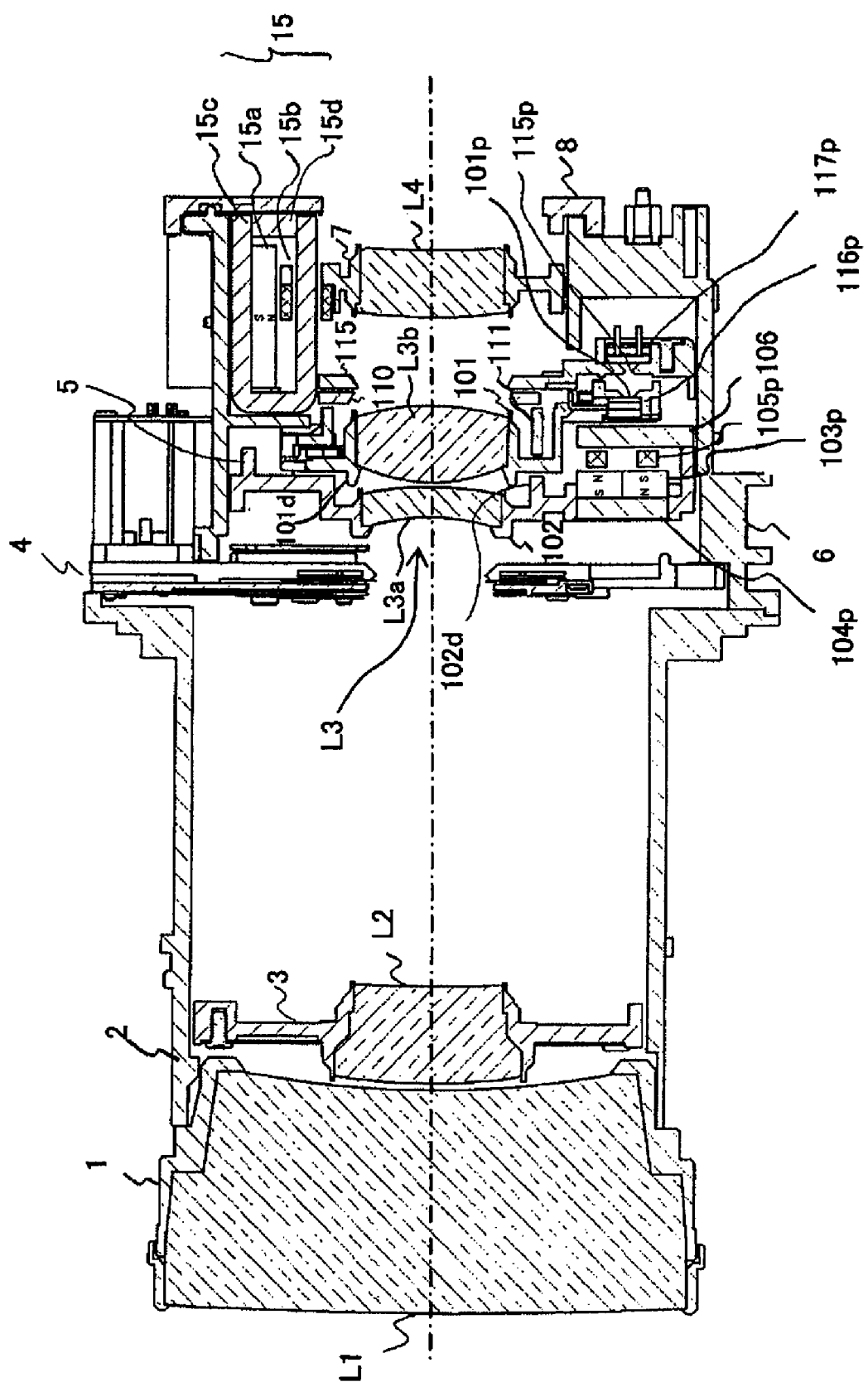
FIG. 3 is a section view showing the lens apparatus of FIG. 2.

FIGS. 2 and 3 show a lens apparatus serving as an optical apparatus provided with an optical image stabilizer that is Embodiment 1 of the present invention. FIG. 2 is an exploded perspective view of the lens apparatus. FIG. 3 is a section view of the lens apparatus.

The lens apparatus in Embodiment 1 includes a variable-magnification optical system formed of four lens units consisting of a convex lens, a concave lens, a convex lens, and a convex lens in order from an object side. In FIG. 3, a dash dotted line shows the optical axis of the variable-magnification optical system.

L1 shows a fixed first lens unit, and L2 shows a second lens unit that is movable in the optical axis direction to provide variable magnification. A third lens unit L3 is formed of a fixed front lens sub-unit L3a and a movable rear lens sub-unit for image stabilization (hereinafter referred to as a correction lens) L3b. The correction lens L3b is moved or shifted in a plane orthogonal to the optical axis of the lens L3b or the optical axis of the variable-magnification optical system (hereinafter, the plane is referred to as the optical-axis-orthogonal plane) to perform operation for image stabilization, that is, image-shake correction operation.

L4 shows a fourth lens unit that is movable in the optical axis direction to correct variations of an image plane associated with magnification varying and to adjust focus.

Reference numeral 1 shows a first barrel that holds the first lens unit L1. Reference numeral 2 shows a front fixed barrel. The first barrel 1 is integrally coupled to the front fixed barrel 2 with screws.

Reference numeral 3 shows a second barrel that holds the second lens unit 2. Reference numeral 4 shows a light-amount adjusting unit (aperture stop) that adjusts the amount of light passing through the variable-magnification optical system by moving a plurality of stop blades to change the diameter of the aperture. The light-amount adjusting unit 4 also serves as a shutter when still images are picked up.

Reference numeral 5 shows an image-stabilization unit serving as the abovementioned optical image stabilizer, later described in detail. Reference numeral 6 shows a rear fixed barrel to which the light-amount adjusting unit 4 and the image-stabilization unit 5 are fixed with screws. The front fixed barrel 2 and the rear fixed barrel 6 are integrally coupled with screws.

Reference numeral 7 shows a fourth barrel that holds the fourth lens unit L4. Reference numeral 8 shows a rear frame that is fixed to the rear fixed barrel 6 with screws. The members secured with screws are positioned through combinations of pins and holes such that the optical axes of the lens units are aligned one another.

The second barrel 3 is supported movably in the optical axis direction in a so-called bar-sleeve method by using two bars 9 and 10 having both ends supported on the front fixed barrel 2 and the rear fixed barrel 6. Reference numeral 11 shows a stepping-motor unit that moves the second barrel 3 in the optical axis direction and is formed of a motor portion 11a, an attachment sheet metal 11b attached to the front fixed barrel 2, and a lead screw portion 11c formed as the output shaft of the motor portion 11a.

The second barrel 3 has a rack member, not shown, which engages with the feed screw portion 11c. Thus, when the motor unit 11 (feed screw portion 11c) is rotated, the second barrel 3 is driven in the optical axis direction.

Reference numeral 12 shows a photointerrupter for detecting a reference position of the second barrel 3. The reference position corresponds to the position where a light-shield portion, not shown, formed in the second barrel 3 shields a light flux from a light-emitting element of the photointerrupter 12. Zoom-reset operation for moving the second barrel 3 to the reference position is performed when the lens apparatus (video camera, later described) is powered on. The number of driving pulses for the stepping motor unit 11 can be counted from the reference position to detect the position of the second lens unit L2.

The fourth barrel 7 is supported movably in the optical axis direction in the bar-sleeve method by using two bars 13 and 14 having both ends supported on the rear fixed barrel 6 and the rear frame 8. Reference numeral 15 shows a liner motor that moves the fourth barrel 7 in the optical axis direction. As shown in FIG. 2, the linear motor 15 is formed of a driving magnet 15a having the S pole and the N pole in directions orthogonal to the optical axis, a driving coil 15b integrally bonded to the fourth barrel 7, and yokes 15c and 15d for forming a magnetic path from the driving magnet 15a.

When an electric current is passed through the driving coil 15b, a magnetic flux is produced thereby and magnetically interferes with a magnetic flux produced by the driving magnet 15a to cause the so-called Lorentz force that drives the fourth barrel 7 in the optical axis direction. In Embodiment 1, as shown in FIG. 2, two linear motors 15 are provided on both sides of the bar 13 and the optical axis to attain balanced driving of the fourth barrel 7.

In FIG. 2, reference numeral 16 shows a position-detection head fixed to the rear fixed barrel 6 and formed of light emitting/receiving elements. Reference numeral 17 shows an optical scale integrally bonded to the fourth barrel 7. A light flux is emitted by the light-emitting element of the position-detection head 16, is reflected by a repeated pattern provided on the optical scale 17, and forms the image of the repeated pattern on the light-receiving element of the position-detection head 16. When the fourth barrel 7 is moved in the optical axis direction, the image of the repeated pattern formed on the light-receiving element of the position-detection head 16 is also moved, so that the information on the movement (movement information) of the fourth barrel 7 can be obtained as an electric signal.

Since the obtained movement information represents a relative movement amount, it is necessary to set and detect the reference position. The reference position can be set by using a photointerrupter and a light-shield portion (light-shield member) or by bringing a reference plane formed on the fourth barrel 7 into contact with a protrusion provided on the rear fixed barrel 6 or the rear frame 8, for example. Focus-reset operation for moving the fourth barrel 7 to the reference position is performed when the lens apparatus (video camera, later described) is powered on. The relative moving amount from the reference position can be detected to determine the position of the fourth lens unit L4.

Figure 1:
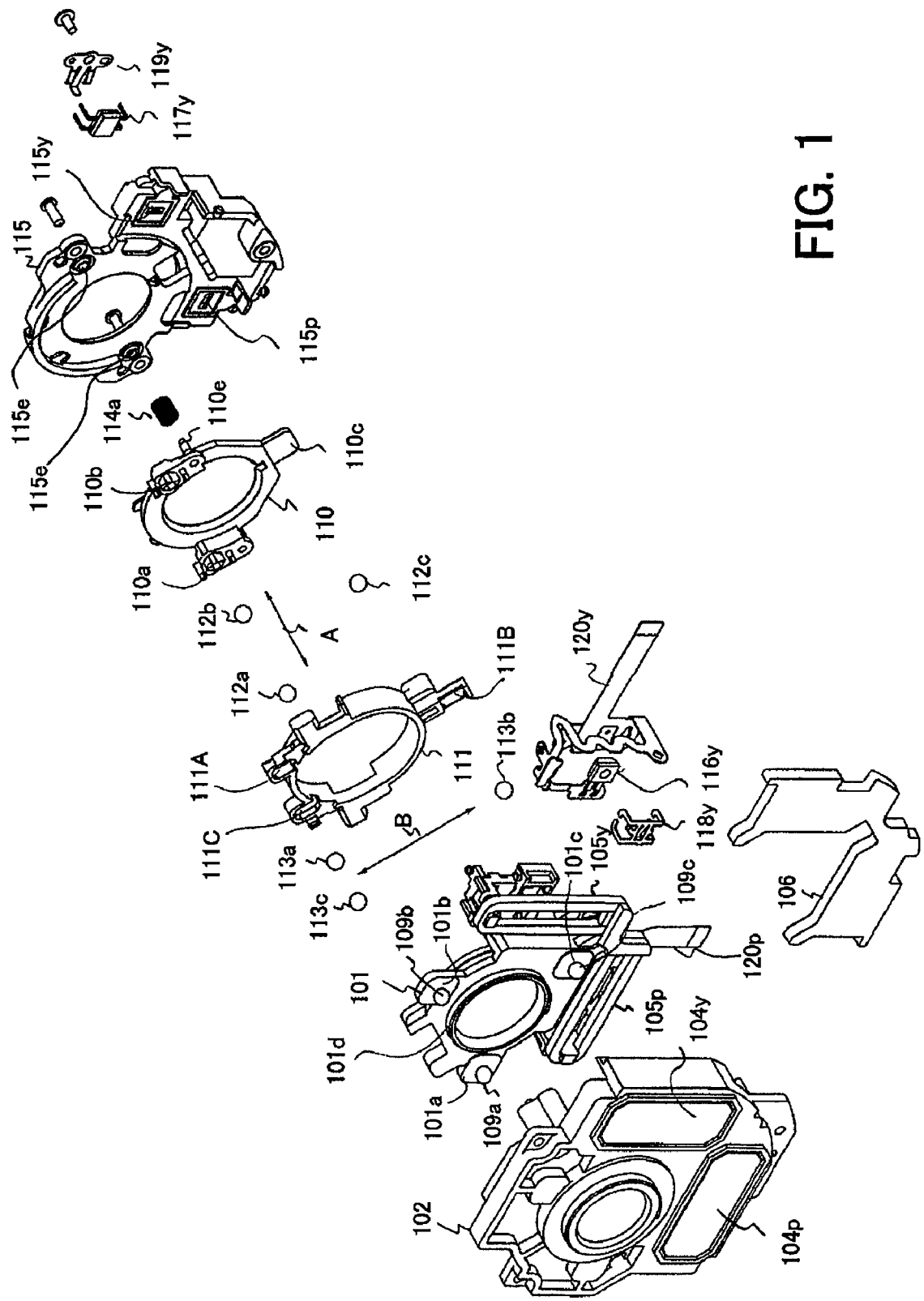
FIG. 1 is an exploded perspective view showing an image-stabilization unit that is a first embodiment (Embodiment 1) of the present invention.
Figure 4:
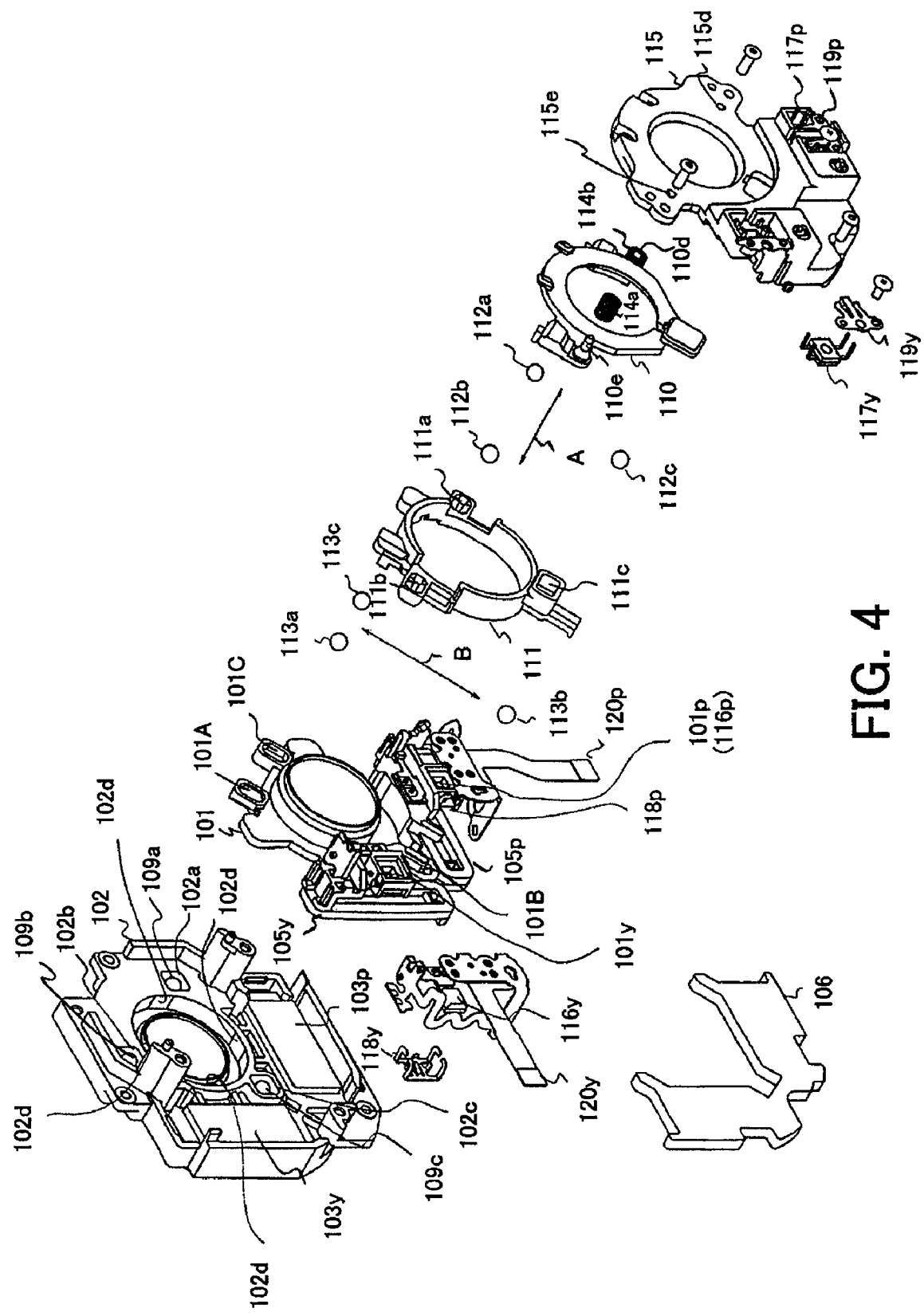
FIG. 4 is an exploded perspective view showing the image-stabilization unit of Embodiment 1.

Next, the configuration of the image-stabilization unit 5 will be described in detail with reference to FIGS. 1, 3, and 4. FIG. 1 is an exploded perspective view of the image-stabilization unit 5 when it is viewed from the front (object side). FIG. 4 is an exploded perspective view of the image-stabilization unit 5 when it is viewed from the back (image-plane side).

Reference numeral 101 shows a shift barrel serving as a lens-holding member that holds the correction lens (rear lens sub-unit) L3b. Reference numeral 102 shows a base barrel that forms part of a base member of the image-stabilization unit and holds the front lens sub-unit L3a.

Reference numeral 103p shows a magnet that is polarized such that two half portions thereof divided in a vertical direction orthogonal to the optical axis have the S poles and the N poles arranged at opposite positions in the optical axis direction. Reference numeral 104p shows a lower yoke placed at the back of the magnet 103p and forming part of a magnetic circuit. Reference numeral 105p shows a driving coil placed to face the two magnetic poles formed in the upper and lower portions of the magnet 103p.

Reference numeral 106 shows an upper yoke that forms part of the magnetic circuit. The lower yoke 104p, the magnet 103p, and the upper yoke 106 are fixed to the base barrel 102 to form the magnetic circuit. The driving coil 105p is fixed to the shift barrel 101 through bonding.

When an electric current is passed through the driving coil 105p, a gap magnetic flux in the magnetic circuit magnetically interferes with a magnetic flux produced by the driving coil 105p to cause the so-called Lorentz force that provides a driving force for the shift barrel 101 to drive it in a pitch direction. In other words, the lower yoke 104p, the magnet 103p, the driving coil 105p, and the upper yoke 106 constitute a first actuator that moves the shift barrel 101 (and thus the correction lens L3b) in the pitch direction (perpendicular direction) orthogonal to the optical axis direction. The pitch direction corresponds to a first direction.

The subscript p in the reference numerals indicates a component for correcting image shake due to rotational shakes in the pitch direction. On the other hand, a subscript y is designated in a component for correcting image shake due to rotational shakes in a yaw direction (horizontal direction orthogonal to the optical axis direction). This applies to the configuration for position detection, later described and Embodiments 2 to 4, later described.

The direction orthogonal to the optical axis (or the plane orthogonal to the optical axis) corresponding to the moving direction of the shift barrel 101 and other members includes not only the direction exactly orthogonal to the optical axis but also the direction not exactly orthogonal within tolerance (which can be considered to be orthogonal). This also applies to Embodiments 2 to 4, later described.

A lower yoke 104y, a magnet 103y, a driving coil 105y, and the upper yoke 106 constitute a second actuator that moves the shift barrel 101 in the yaw direction. The yaw direction corresponds to a second direction.

Reference numerals 109a, 109b, and 109c show three first balls (spherical members) in Embodiment 1. The first balls 109a, 109b, and 109c may be made of SUS440 or ceramic material that is hard and excellent in form accuracy and surface finish. Ceramic, in particular, is a non-magnetic material and thus is preferable since it is not absorbed by a magnet or affected by a surrounding magnetic field. This applies to Embodiments 2 to 4, later described.

The three balls 109a to 109c are placed in rectangular concave portions 102a, 102b, and 102c formed in the base barrel 102 and having flat bottom surfaces, respectively. The inner surfaces of the concave portions 102a, 102b, and 102c limit the moving ranges of the first balls 109a, 109b, and 109c. The first balls 109a, 109b, and 109c contact flat portions 101a, 101b, and 101c formed on the shift barrel 101, respectively. The shift barrel 101 is biased toward the base barrel 102 by a biasing force of a first biasing member, later described. The biasing force causes the first balls 109a, 109b, and 109c to be sandwiched between the bottom surfaces of the concave portions 102a to 102c and the flat portions 101a to 101c in the optical axis direction, respectively.

Each of the concave portions has a dimension to allow rolling of the first balls during the movement of the shift barrel 101 from the central position of its movable range (optical axis position of the variable-magnification optical system) to the mechanical limit position of the movable range after the first ball is placed at the center of the concave portion.

This permits the shift barrel 101 to be moved with respect to the base barrel 102 in the optical-axis-orthogonal plane while the first balls 109a to 109c are rolled. The mechanically maximum movable amount of the shift barrel 101 is determined such that a certain space is left between a cylindrical portion 101d of the shift barrel 101 and flat portions 102d formed in the pitch direction and the yaw direction on the inner circumference of the base barrel 102.

Next, description will be made of reduction (limit) of rotation of the shift barrel 101 about the optical axis.

Reference numeral 110 shows a guide member serving as a first guide member. Reference numeral 111 shows a rotation-preventing member serving as a second guide member placed between the guide member 110 and the shift barrel 101.

Reference numeral 112a and 112b show two second balls. The second balls 112a and 112b are placed in a first limit portion formed in each of the guide member 110 and the rotation-preventing member 111.

Reference numerals 110a and 110b show first guide-groove portions that are formed at two positions in the guide member 110 and serve as the abovementioned first limit portions. Reference numeral 111a and 111b show first guide-groove portions that are formed at two positions in the rotation-preventing member 111 and serve as the abovementioned first limit portions. The second ball 112a is placed in the space formed by the first guide-groove portions 110a and 111a opposite to each other in the optical axis direction. The second ball 112b is placed in the space formed by the first guide-groove portions 110b and 111b opposite to each other in the optical axis direction.

The guide member 110 is biased toward the rotation-preventing member 111 (and the shift barrel 101) by a biasing force from a second biasing member, later described, and the biasing force causes the second balls to be sandwiched between the first guide-groove portions. In other words, each of the first guide-groove portions engages with the second ball.

Each of the first guide-groove portions is formed to extend in a direction of an arrow A in FIGS. 1 and 4 and has such a length that the guide member 110 and the rotation-preventing member 111 are relatively moved in the direction of the arrow A while rolling the second balls. The end surfaces of the first guide-groove portion in the direction of the arrow A contact the second ball to limit the relative moving range of the guide member 110 and the rotation-preventing member 111. The direction of the arrow A corresponds to a third direction orthogonal to the optical axis.

In addition, each of the first guide-groove portions contacts or engages with the second ball to limit the relative movement of the guide member 110 and the rotation-preventing member 111 in a direction different from the direction of the arrow A.

In other words, each of the guide member 110 and the rotation-preventing member 111 has the first limit portion contacting on the second ball to allow the relative movement of the guide member 110 and the rotation-preventing member 111 in the third direction accompanied by the rolling of the second ball and to limit the relative movement thereof in a direction different from the third direction with the second ball.

The shape of the first guide-groove portion will be described later in detail.

Reference numerals 113a and 113b show two third balls. The third balls 113a and 113b are placed in a second limit portion formed in each of the rotation-preventing member 111 and the shift barrel 101.

Reference numerals 111A and 111B show second guide-groove portions that are formed at two positions of the rotation-preventing member 111 and serve as the abovementioned second limit portions. Reference numerals 101A and 101B show second guide-groove portions that are formed at two positions of the shift barrel 101 and serve as the abovementioned second limit portions. The third ball 113a is placed in the space formed by the second guide-groove portions 111A and 101A opposite to each other in the optical axis direction. The third ball 113b is placed in the space formed by the second guide-groove portions 111B and 101B opposite to each other in the optical axis direction.

The rotation-preventing member 111 is biased toward the shift barrel 101 by a biasing force from the second biasing member, later described, acting through the guide member 110, and the biasing force causes the third balls to be sandwiched between the second guide-groove portions. In other words, each of the second guide-groove portions engages with the third ball.

Each of the second guide-groove portions is formed to extend in a direction of an arrow B in FIGS. 1 and 4 and has such a length that the rotation-preventing member 111 and the shift barrel 101 are relatively moved in the direction of the arrow B while rolling the third ball. The end surfaces of the second guide-groove portion in the direction of the arrow B contact the third ball to limit the relative moving range of the rotation-preventing member 111 and the shift barrel 101 in that direction. The direction of the arrow B corresponds to a fourth direction orthogonal to the optical axis.

In addition, each of the second guide-groove portions contacts or engages with the third ball to limit the relative movement of the rotation-preventing member 111 and the shift barrel 101 in a direction different from the direction of the arrow B.

In other words, each of the rotation-preventing member 111 and the shift barrel 101 has the second limit portion contacting the third balls to allow the relative movement of the rotation-preventing member 111 and the shift barrel 101 in the fourth direction accompanied by the rolling of the third ball and to limit the relative movement thereof in a direction different from the fourth direction with the third ball.

The shape of the second guide-groove portion will be described later in detail.

In Embodiment 1, the direction of the arrow A and the direction of the arrow B form an angle of 45 degrees with respect to the pitch direction and the yaw direction and are orthogonal to each other.

Reference numerals 114a and 114b show guide springs serving as the second biasing member that biases the guide member 110 toward the rotation-preventing member 111 and the shift barrel 101 in the optical axis direction.

Reference numeral 115 shows a sensor base positioned with respect to the base barrel 102 and secured with screws. The base barrel 102 and the sensor base 115 constitute the base member serving as a fixed member.

The guide member 110 is positioned in the optical-axis-orthogonal plane by inserting positioning pins 110d and 110e provided for the guide member 110 into a positioning hole 115d and a rotation-preventing elongated hole 115e formed in the sensor base 115, respectively.

The guide springs 114a and 114b are formed of compression coil springs and have one ends contacting the base portions of the positioning pins 110d and 111e and the other ends contacting the sensor base 115 to bias the guide member 110 toward the shift barrel 101.

Reference numeral 112c shows a ball that is disposed between the guide member 110 and the rotation-preventing member 111 together with the balls 112a and 112b. The ball 112c is placed in a concave portion 111c formed in the rotation-preventing member 111 and having a flat bottom surface. The concave portion 111c has dimensions to allow rolling of the ball 112c in the direction of the arrow A similarly to the first guide-groove portion 111a. The ball 112c contacts a flat portion 110c formed on the guide member 110.

The concave portion 111c has a width somewhat larger than the dimensions of the ball 112c in the direction orthogonal to the direction of the arrow A (direction of the arrow B). The width permits slight displacements of the guide member 110 and the rotation-preventing member 111 in the direction of the arrow B due to manufacture errors of the first guide-groove portions to achieve smooth relative movement of the guide member 110 and the rotation-preventing member 111 in the direction of the arrow A.

The resultant of the biasing forces of the guide springs 114a and 114b acts on the guide member 110 to pass through the triangle having the apexes at the three balls 112a to 112c. This enables the guide member 110 to be stably biased toward the shift barrel 101.

Reference numeral 113c shows a ball sandwiched between the rotation-preventing member 111 and the shift barrel 101 together with the third balls 113a and 113b. The ball 113c is placed in a concave portion 101C formed in the shift barrel 101 and having a flat bottom surface. The concave portion 101C has dimensions to permit rolling of the ball 113c in the direction of the arrow B similarly to the guide-groove portion 101b. The ball 113c is also placed in a concave portion 111C formed in the rotation-preventing member 111 and contacts the bottom surface thereof.

Each of the concave portions 101C and 111C has a width somewhat larger than the dimensions of the ball 113c in the direction orthogonal to the direction of the arrow B (direction of the arrow A). This allows slight displacements of the rotation-preventing member 111 and the shift barrel 101 in the direction of the arrow A due to manufacture errors of the second guide-groove portions to achieve smooth relative movement of the rotation-preventing member 111 and the shift barrel 101 in the direction of the arrow B.

The resultant of the biasing forces of the guide springs 114a and 114b acts on the rotation-preventing member 111 to pass through the triangle having the apexes at the three balls 113a to 113c. This enables the rotation-preventing member 111 to be stably biased toward the shift barrel 101.

In Embodiment 1, the biasing forces of the guide springs 114a and 114b described as the second biasing member also bias the shift barrel 101 toward the base barrel 102. In other words, the guide springs 114a and 114b double as the first biasing member.

Next, the shape of the guide-groove portions for holding the balls will be described with reference to FIGS. 5A, 6A, and 6B. The shape of the second guide-groove portions 111A and 101A for holding the third ball 113a will be explained in detail as an example.

Figure 5A:
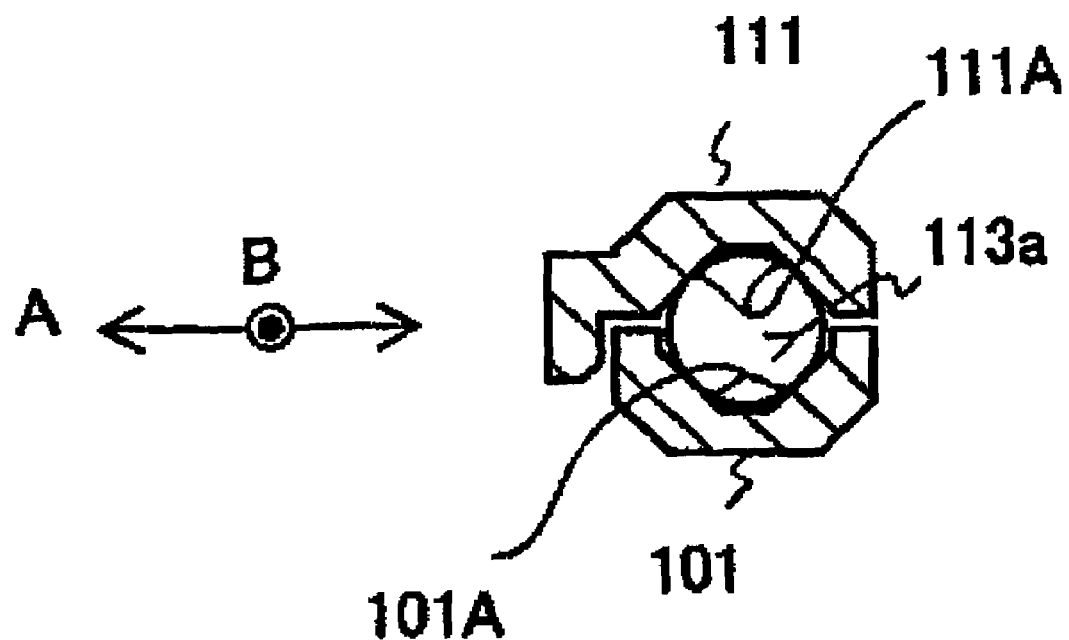
FIG. 5A is a section view showing guide-groove portions in the image-stabilization unit of Embodiment 1.

FIG. 5A is a section view showing the second guide-groove portions 111A and 101A taken along a plane orthogonal to the direction of the arrow B. FIGS. 6A and 6B are section views showing the second guide-groove portions 111A and 101A taken along a plane orthogonal to the direction of the arrow A.

In the section view of FIG. 5A, each of the second guide-groove portions 111A and 101A has two inclined surfaces tapering so that their distance becomes narrower toward the bottom from the opening. The third ball 113a contacts the two inclined surfaces of the second guide-groove portion 111A at two positions and the two inclined surfaces of the second guide-groove portion 101A at two positions, the two inclined surfaces sandwiching the third ball 113a. The third ball may contact each of the second guide-groove portion at three or more positions.

Figure 6A:
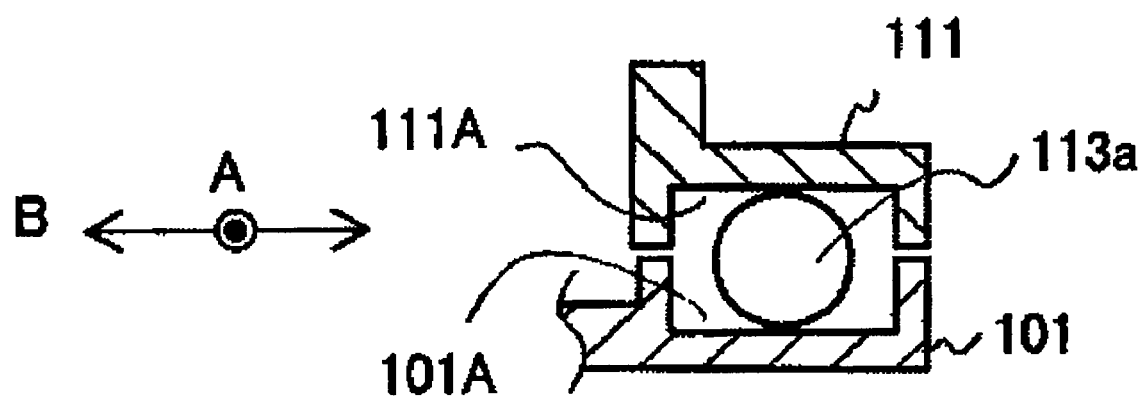
FIG. 6A is a section view showing the guide-groove portions in a longitudinal direction in the image-stabilization unit of Embodiment 1.
Figure 6B:
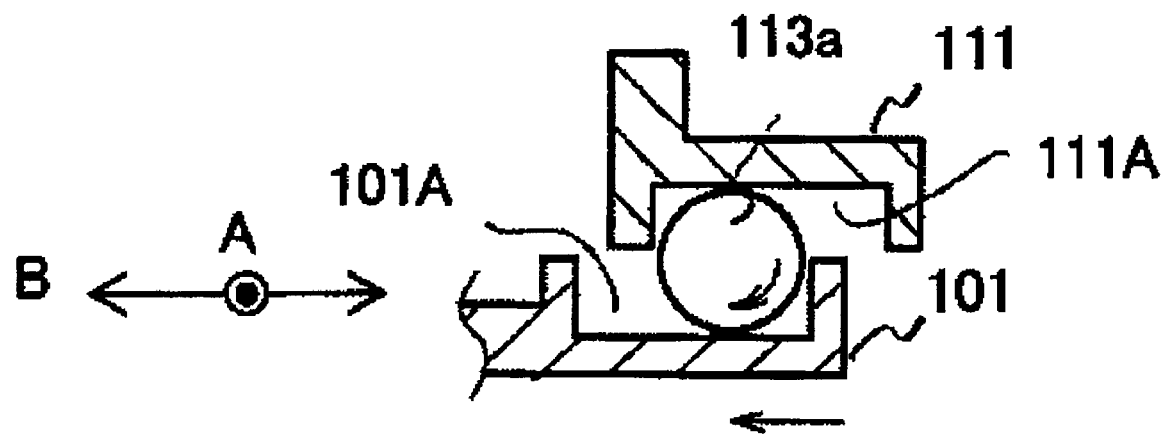
FIG. 6B is a section view showing the guide-groove portions in the longitudinal direction in the image-stabilization unit of Embodiment 1.

As shown in FIGS. 6A and 6B, when the shift barrel 101 is moved in the optical-axis-orthogonal plane with respect to the rotation-preventing member 111, the third ball 113a is rolled in the direction of the arrow B in which each inclined surface extends. On the other hand, the movement in the groove-width direction (the direction of the arrow A orthogonal to the direction of the arrow B) in which the two inclined surfaces are arranged is prevented by the contact of the third ball 113a with the two inclined surfaces.

The second guide-groove portions 111B and 101B are formed in the same manner. For the first guide-groove portions (110a, 111a), (110b, 111b), the shape is identical to that of the second guide-groove portion except that each inclined surface extends in the direction of the arrow A. The second balls 112a and 112b are allowed to roll in the direction of the arrow A in which each inclined surface extends and are prevented from movement in the groove-width direction.

With the abovementioned configuration, the rotation-preventing member 111 can be moved only in the direction of the arrow A with respect to the guide member 110 (that is, the base barrel 102) and the shift barrel 101 can be moved only in the direction of the arrow B with respect to the rotation-preventing member 111. Therefore, the shift barrel 101 can be moved in parallel with (that is, can be moved parallel in) the optical-axis-orthogonal plane while the rotation thereof about the optical axis is limited (prevented).

FIG. 6A shows the third ball 113a at the initial position (central position in the direction of the arrow B) in the second guide-groove portions 111A and 101A. When the shift barrel 101 is moved from the initial state with respect to the rotation-preventing member 111, the third ball 113a is rolled in the second guide-groove portions 111A and 101A until the shift barrel 101 is moved by the maximum movable amount. In other words, the second guide-groove portions 111A and 101A have the lengths in the direction of the arrow B to permit only rolling of the third ball 113a when the shift barrel 101 is moved from the initial position.

On the other hand, when the shift barrel 101 is moved to the left from the state in which the ball 113a is widely displaced to the left from the initial position in FIG. 6A, the third ball 113a comes into contact with the left end surface of the second guide-groove portion 111A before the shift barrel 101 is moved by the maximum movable amount. Thus, the ball 113a is not rolled but slid on the second guide-groove 101A until the shift barrel 101 is moved by the maximum movable amount. As a result, sliding friction is produced between the second guide-groove portions 111A and 101A to reduce the driving responsivity of the image-stabilization unit 5.

To address this, in Embodiment 1, the shift barrel 101 is once moved by the maximum movable amount on start-up of the lens apparatus, and then the shift barrel 101 is returned to the central position of the movable range. Through this operation, the third ball 113a, which was at first widely displaced from the initial position in the second guide-groove portions 111A and 101A, is returned to or near the initial position.

In summary, the longitudinal dimensions of all of the guide-groove portions (and the concave portions) are set to have an appropriate length, and the shift barrel 101 is driven by the mechanically maximum movable amount or the maximum movable amount in active use and then returned to the central position of the movable range, thereby moving the balls to the initial position. The operation will be referred to as ball-reset operation in the following description.

With the ball-reset operation, the shift barrel 101 can be guided in all of the driving directions only by the ball rolling without backlash in active use, and any sliding friction is not produced, so that the driving responsivity is improved.

The description of the lengths of the first and second guide-groove portions in the directions of the arrow A and arrow B and the ball-reset operation applies to Embodiments 2 to 4, later described.

Figure 5B:
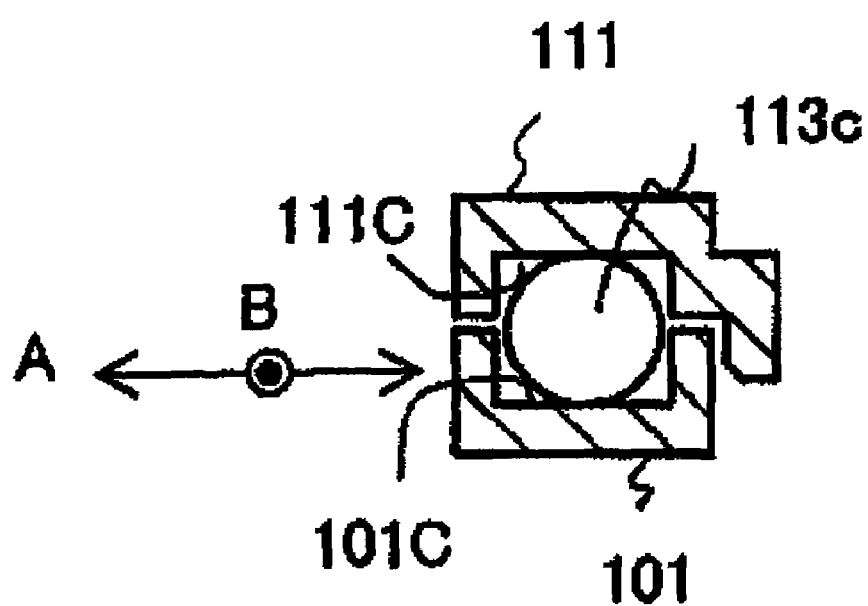
FIG. 5B is a section view showing concave portions in the image-stabilization unit of Embodiment 1.

Next, description will be made of the concave portions 111C and 101C formed in the rotation-preventing member 111 and the shift barrel 101, respectively, for holding the ball 113c provided together with the third balls 113a and 113b with reference to FIG. 5B. FIG. 5B is a section view showing the concave portions 111C and 101C taken along a plane orthogonal to the direction of the arrow B.

Each of the concave portions 111C and 101C has a flat bottom surface that contacts each end of the ball 113c in the optical axis direction to sandwich the ball 113c.

On the other hand, as described above, each of the concave portions 111C and 101C has a width somewhat larger than the dimensions of the ball 113c in the direction of the arrow A orthogonal to the direction of the arrow B. As described earlier, this allows slight displacements of the rotation-preventing member 111 and the shift barrel 101 in the direction of the arrow A due to manufacture errors of the guide-groove portions to achieve smooth relative movement of the rotation-preventing member 111 and the shift barrel 101 in the direction of the arrow B.

This applies to the concave portions 110c and 111c formed in the guide member 110 and the rotation-preventing member 111, respectively, for holding the ball 112c provided together with the second balls 112a and 112b.

Next, the configuration for detecting the position of the shift barrel 101 will be described with reference to FIGS. 1, 3, and 4.

Reference numeral 116p shows an iRED that serves as a light-emitting element and emits an infrared-light flux in the optical axis direction. The iRED 116p is fixed to the shift barrel 101 via an attachment sheet metal 118p. Reference numeral 117p shows a PSD that serves as a light-receiving element and is fixed to the sensor base 115 with screws via a fixed sheet metal 119p. Reference numeral 101p shows a light-projecting window for the iRED 116p formed in the shift barrel 101.

Reference numeral 115p shows a slit formed in the sensor base 115. The infrared-light flux emitted from the iRED 116p is limited by the slit 115p such that part of the light flux passes through the slit 115p and is received by the PSD 117p.

The slit 115p is an opening elongated in the horizontal direction (yaw direction). The PSD 117p has detection sensitivity in the pitch direction. The iRED 116p and the light-projecting window 101p are provided for the movable shift barrel 101, while the slit 115p and the PSD 117p are provided for the fixed sensor base 115.

For example, when the shift barrel 101 is moved upward in the pitch direction, a light flux passing through the slit 115p is displaced downward on the PSD 117p, so that the moving amount of the shift barrel 101 in the pitch direction is detected. On the other hand, when the shift barrel 101 is moved in the horizontal direction (yaw direction), the infrared-light flux from the iRED 116p passes through the slit 115p and reaches the PSD 117p since the slit 115p is the opening elongated in the horizontal direction. However, the PSD 117p has no detection sensitivity in the horizontal direction and thus that movement is not detected.

In this manner, the position detector formed of the iRED 116p, the light-projecting window 101p, the slit 115p, and the PSD 117p performs the position detection of the shift barrel 101 in the pitch direction.

On the other hand, the position detector formed of an iRED 116y, a light-projecting window 101y, a slit 115y, and a PSD 117y performs the position detection of the shift barrel 101 in the yaw direction based on the same detection principles as those in the pitch direction.

Reference numeral 120p shows a flexible substrate used for electric connection between the electric elements relating to the driving and position detection of the shift barrel 101 in the pitch direction and an external circuit. Reference numeral 120y shows a flexible substrate used for electric connection between the electric elements relating to the driving and position detection of the shift barrel 101 in the yaw direction and the external circuit.

Figure 7:
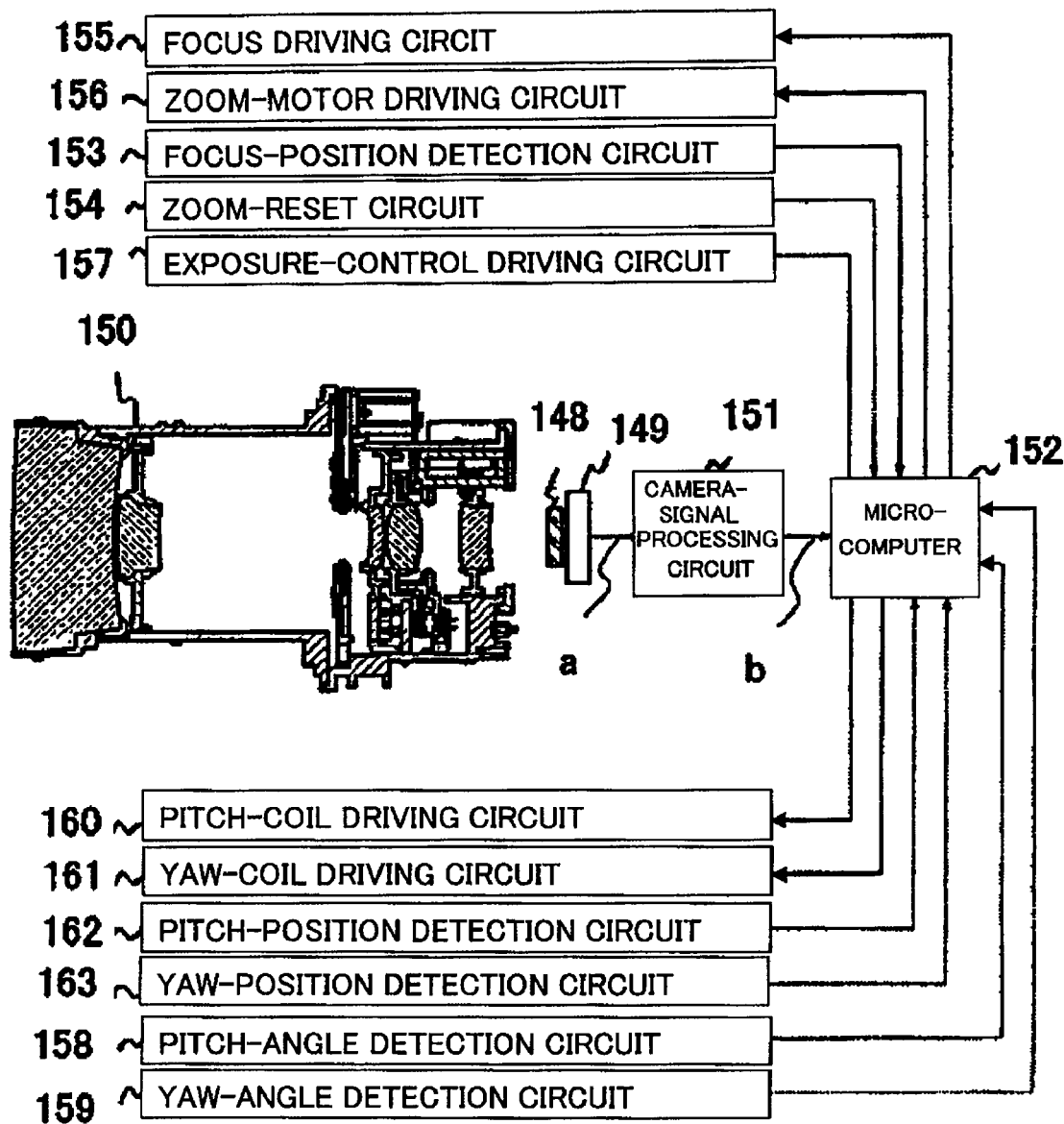
FIG. 7 is a block diagram showing the system configuration of a video camera including the lens apparatus according to Embodiment 1.

Next, description will be made of the configuration of the video camera serving as the optical apparatus including the lens apparatus having the image-stabilization unit 5 of Embodiment 1 as a lens barrel portion with reference to FIG. 7. In Embodiment 1, the video camera including the integral lens apparatus will be described, but the image-stabilization unit having the abovementioned configuration can be mounted on an interchangeable lens apparatus serving as an optical apparatus that is removably mounted on a video camera or a single-lens reflex camera. This applies to Embodiments 2 to 4, later described.

A lens apparatus 150 is realized by the lens apparatus described in FIGS. 2 and 3 and includes the image-stabilization unit of Embodiment 1.

A light flux passes through the variable-magnification optical system in the lens apparatus 150, travels through an optical filter 148 having an infrared-light cutting function and an optical low-pass function, and forms an optical image on an image plane. An image-pickup element 149 formed of a CCD sensor or a CMOS sensor is placed on the image plane and converts the optical image into an electric signal. An electric signal a is read from the image-pickup element 149 and is converted into an image signal b by a camera-signal processing circuit 151.

Reference numeral 152 shows a microcomputer for controlling the lens driving. The microcomputer 152 moves the second lens unit L2 through a zoom-motor driving circuit 156 while monitoring an output from a zoom-reset circuit 154 including the abovementioned photointerrupter 12. The microcomputer 152 moves the fourth lens unit L4 through a focus driving circuit 155 while monitoring an output from a focus-position detection circuit 153 formed of the abovementioned position-detection head 16 and the optical scale 17. In this manner, the microcomputer 152 can perform zoom control and focus control while obtaining accurate focus-length information and focus-position information.

Reference numeral 157 shows an exposure-control driving circuit that drives the light-amount adjusting unit 4 and controls the diameter of the aperture of the light-amount adjusting unit 4 and insertion or retraction of an ND filter, not shown, based on the brightness information of the image signal b taken by the microcomputer 152 from the camera-signal processing circuit 151.

Reference numerals 158 and 159 show angle detection circuits that detect the angles of shake of the video camera in the pitch direction and yaw direction, respectively. The shake angles are detected by integrating outputs from an angular velocity sensor such as a vibration gyro. The outputs from the angle detection circuits 158 and 159, that is, the inclined-angle information, are taken by the microcomputer 152. While the directions in which the position detection circuits 158 and 159 detect positions are matched with the pitch direction and yaw direction corresponding to the directions in which the first and second actuators produce the driving forces in Embodiment 1, the directions may be different one another.

Reference numerals 160 and 161 show coil driving circuits that applies electric currents to the abovementioned driving coils 105p and 105y in order to move the shift barrel 101 of the image-stabilization unit 5 in the pitch direction and yaw direction.

Reference numerals 162 and 163 show position detection circuits that drive the iREDs 116p and 116y and the PSDs 117p and 117y in order to detect the positions (shift positions) of the shift barrel 101 in the pitch direction and yaw direction. Outputs from the PSD 117p and 117y are taken by the microcomputer 152. The position detection circuit (position detector) may be of a magnetic type using a magnet and a hall element instead of the optical type using the iRED and the PSD.

When the shift barrel 101 (correction lens L3b) is moved in the optical-axis-orthogonal plane, a light flux passing through the correction lens L3b is bent to move the optical image formed on the image-pickup element 149. The electric currents applied to the driving coils 105p and 105y are controlled such that the moving direction of the optical image due to the movement of the shift barrel 101 is opposite to the original moving direction of the optical image due to the inclination of the video camera and that the moving amount of the optical image due to the movement of the shift barrel 101 is identical to the original moving amount of the optical image. Through the control, the optical image formed on the image-pickup element 149 is hardly moved even when the video camera is inclined (camera shake is caused). In other words, optical image stabilization is performed.

The microcomputer 152 subtracts the shift position information obtained by the position detection circuits 162 and 163 from the inclination angle information obtained by the angle detection circuits 158 and 159 and performs amplification and phase compensation on the differential signals. In accordance with the resulting driving information, the microcomputer 152 controls with feedback the electric currents applied to the driving coils 105p and 105y via the coil driving circuits 160 and 161 to reduce the value of the abovementioned differential signals.

The abovementioned ball-reset operation is performed subsequently to the zoom-reset and focus-reset operation when the video camera is powered on, or is performed in parallel in a time-division manner. Thus, even when each ball is displaced from the initial position before the power-on of the video camera, the ball is rolled to guide the shift barrel 101 and prevent the rotation of the shift barrel 101 after image pickup is started, thereby accomplishing excellent image-stabilization performance.

The ball-reset operation may be performed as appropriate when the microcomputer 152 determines that the video camera is not picking up images, so that excellent image-stabilization performance may be provided in image pickup. For example, the inclination angle of the video camera is monitored, and the ball-reset operation is performed when it is determined that a user is simply carrying the video camera. In general, a camera-shake angle often ranges from approximately 0.5 to 1 degree, and an inclination larger than that camera-shake angle is produced when a user sets the functions of the video camera or looks for an object in a viewfinder before image pickup. Thus, the ball-reset operation may be performed if such a large inclination is detected.

As described above, in Embodiment 1, the balls that can be rolled are used to allow the movement of the shift barrel 101 in the optical-axis-orthogonal plane while the displacement thereof in the optical axis direction is prevented, and the balls that can be rolled are used to guide the parallel movement of the shift barrel 101 while the rotation thereof is prevented. This can reduce the driving resistance of the shift barrel 101 to accurately control the position of the shift barrel 101 even when the shift barrel 101 is slightly driven. In other words, it is possible to realize the image-stabilization unit having the favorable image-stabilization performance.

Since the shift barrel 101 can be moved with reduced backlash, the image-stabilization operation can be performed with a lowered noise level, and position feedback control can be attained accurately.

In Embodiment 1, the shift barrel 101 is guided in the optical-axis-orthogonal plane by the first balls 109a to 109c sandwiched between the shift barrel 101 and the base barrel 102 serving as the fixed member in the lens apparatus. This can avoid the position accuracy of the shift barrel 101 from being affected by accumulated manufacture errors produced by placing balls and a guide member or a rotation-preventing member between the base barrel 102 and the shift barrel 101 for preventing the rotation of the shift barrel 101. Consequently, the position control of the shift barrel 101 can be performed with higher accuracy.

In Embodiment 1, the guide springs 114a and 114b doubling as the first biasing member and the second biasing member are used to reduce the number of constituent members to provide a reduction in size of the image-stabilization unit. Since the guide springs 114a and 114b are not deformed in the optical-axis-orthogonal direction in association with the movement of the shift barrel 101 in the optical-axis-orthogonal plane, it is possible to avoid an increased driving load in the shift barrel 101 resulting from such deformation.

In Embodiment 1, the pitch direction (first direction) and the yaw direction (second direction) in which the first and second actuators produce the driving forces are different from the third direction in which the second guide-groove portions 101A and 101B extend to prevent the rotation of the shift barrel 101. This enables the second guide-groove portion 101B to be placed in a corner space formed inside the first and second actuators in the shift barrel 101. The corner space that otherwise would be dead space can be effectively used to reduce the size of the shift barrel 101 and thus the image-stabilization unit 5. This applies to Embodiments 3 and 4, later described. However, the first and second directions may be identical to the third and fourth directions.

Embodiment 2

Figure 8:
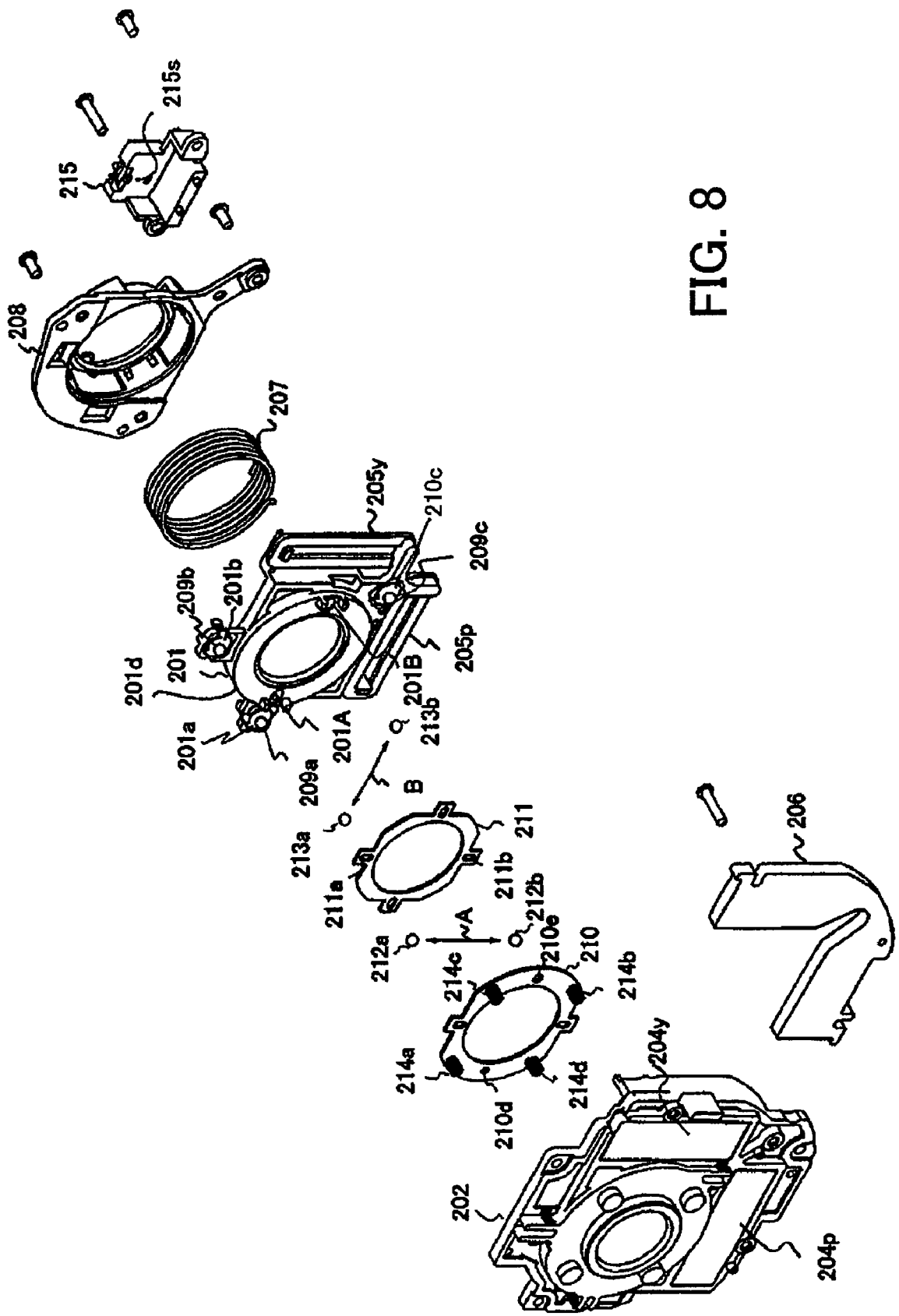
FIG. 8 is an exploded perspective view showing an image-stabilization unit that is a second embodiment (Embodiment 2) of the present invention.
Figure 9:
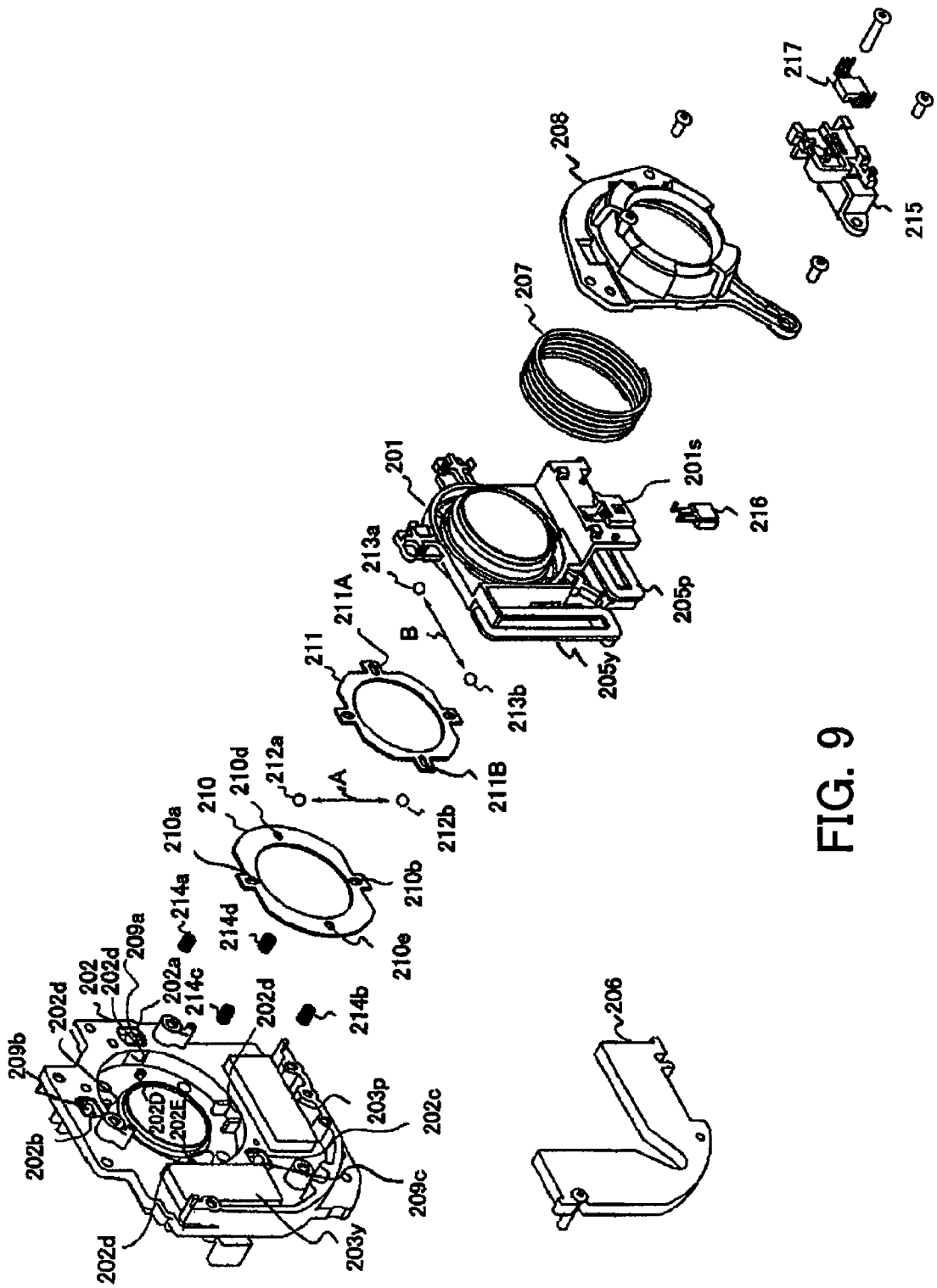
FIG. 9 is an exploded perspective view showing the image-stabilization unit of Embodiment 2.
Figure 10:
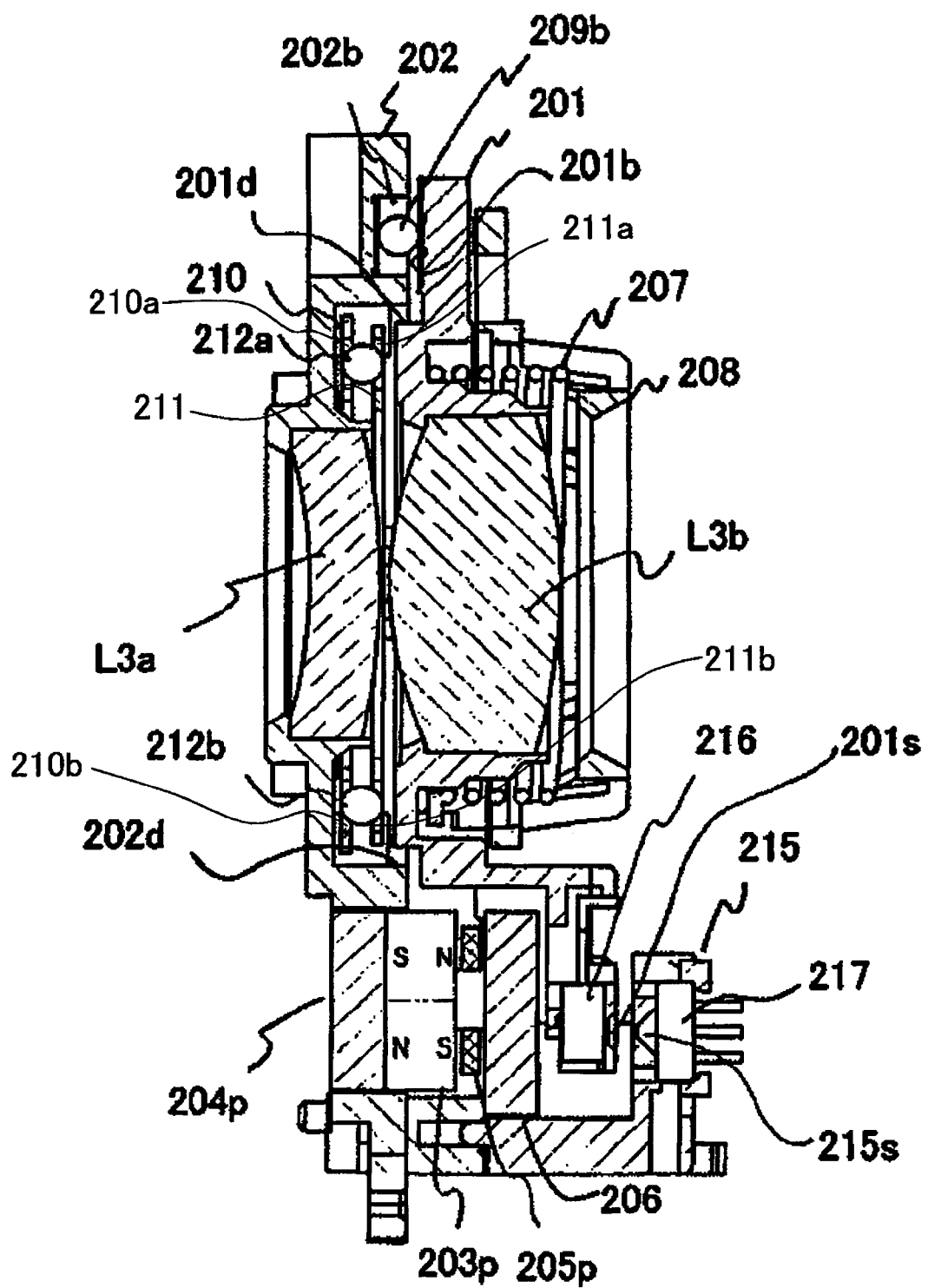
FIG. 10 is an exploded perspective view showing the image-stabilization unit of Embodiment 2.

FIGS. 8, 9, and 10 show the configuration of an image-stabilization unit that is Embodiment 2 of the present invention. FIG. 8 is an exploded perspective view showing the image-stabilization unit when it is viewed from the front, and FIG. 9 is an exploded perspective view showing the image-stabilization unit when it is viewed from the back. FIG. 10 is a section view showing the image-stabilization unit. The image-stabilization unit of Embodiment 2 is mounted on the lens apparatus shown in FIGS. 2 and 3, and the lens apparatus constitutes the lens barrel portion of the video camera shown in FIG. 7.

Reference numeral 201 shows a shift barrel serving as a lens-holding member that holds a correction lens L3b. Reference numeral 202 shows a base barrel that serves as a base member and holds a front lens sub-unit L3a.

Reference numeral 203p shows a magnet that is polarized such that two half portions thereof divided in a vertical direction orthogonal to an optical axis have the S poles and the N poles arranged at opposite positions in the optical axis direction. Reference numeral 204p shows a lower yoke placed at the back of the magnet 203p and forming part of a magnetic circuit. Reference numeral 205p shows a driving coil placed to face the two magnetic poles formed in the upper and lower portions of the magnet 203p. Reference numeral 206 shows an upper yoke that forms part of the magnetic circuit. The lower yoke 204p, the magnet 203p, and the upper yoke 206 are fixed to the base barrel 202 to form the magnetic circuit. The driving coil 205p is fixed to the shift barrel 201 through bonding.

When an electric current is passed through the driving coil 205p, a gap magnetic flux in the magnetic circuit magnetically interferes with a magnetic flux produced by the driving coil 205p to cause the Lorentz force that provides a driving force for the shift barrel 201 to drive it in a pitch direction. In other words, the lower yoke 204p, the magnet 203p, the driving coil 205p, and the upper yoke 206 form a first actuator that moves the shift barrel 201 (and thus the correction lens L3b) in the pitch direction. The pitch direction corresponds to a first direction.

A lower yoke 204y, a magnet 203y, a driving coil 205y, and the upper yoke 206 form a second actuator that moves the shift barrel 201 in a yaw direction. The yaw direction corresponds to a second direction.

Reference numeral 207 shows a shift spring serving as a first biasing member that biases the shift barrel 201 toward the base barrel 202. The shift spring 207 is a compression coil spring having one end that has an inner diameter fitted to the outer circumference of the cylindrical portion formed around the correction lens L3b in the shift barrel 201. Reference numeral 208 shows a spring holder that holds the other end of the shift spring 207 and is fixed to the base barrel 202 with screws.

Next, description will be made of the configuration for supporting the shift barrel 201 on the base barrel 202 and the limit of rotation of the shift barrel 201 about the optical axis.

Reference numerals 209a, 209b, and 209c show three first balls. The three first balls 209a to 209c are placed in rectangular concave portions 202a, 202b, and 202c having flat bottom surfaces and formed at three positions of the base barrel 202. On the other hand, flat portions 201a, 201b, and 201c with which the three first balls 209a to 209c come into contact are formed at three positions of the shift barrel 201. The first balls 209a to 209c are sandwiched between the bottom surfaces of the concave portions 202a, 202b, and 202c and the flat portions 201a, 201b, and 201c, respectively, by a biasing force from the shift spring 207.

Each of the concave portions has a dimension to allow rolling of the first balls during the movement of the shift barrel 201 from the central position of the movable range to the mechanical limit position of the movable range after the first ball is placed at the center of the concave portion.

This permits the shift barrel 201 to be moved with respect to the base barrel 202 in an optical-axis-orthogonal plane while the first balls 209a to 209c are rolled. The mechanically maximum movable amount of the shift barrel 201 is determined such that a certain space is left between a cylindrical portion 201d of the shift barrel 201 and flat portions 202d formed in the pitch direction and the yaw direction on the inner circumference of the base barrel 202.

Reference numeral 210 shows a guide member serving as a first guide member. Reference numeral 211 shows a rotation-preventing member serving as a second guide member placed between the guide member 210 and the shift barrel 201.

Reference numeral 212a and 212b show two second balls. The second balls 212a and 212b are placed in a first limit portion formed in each of the guide member 210 and the rotation-preventing member 211.

Reference numerals 210a and 210b show first guide-groove portions that are formed at two positions in the guide member 210 and serve as the first limit portions. Reference numeral 211a and 211b show first guide-groove portions that are formed at two positions in the rotation-preventing member 211 and serve as the first limit portions. Each of the first guide-groove portions is provided to extend through the guide member 210 and the rotation-preventing member 211, and has the shape of an elongated groove extending in the direction of an arrow A.

The first guide-groove portions 210a and 211a are opposed to each other in the optical axis direction, and the second ball 212a is placed therebetween. The first guide-groove portions 210b and 211b are opposed to each other in the optical axis direction, and the second ball 212b is placed therebetween.

The guide member 210 is biased toward the rotation-preventing member 211 (and the shift barrel 201) by a biasing force from a second biasing member, later described, and the biasing force allows the second balls to be sandwiched between the first guide-groove portions.

Each of the first guide-groove portions is formed to extend in the direction of the arrow A in FIGS. 8 and 9 and has such a length that the guide member 210 and the rotation-preventing member 211 are relatively moved in the direction of the arrow A while rolling the second ball. The end surfaces of the first guide-groove portion in the direction of the arrow A contact the second ball to limit the relative moving range of the guide member 210 and the rotation-preventing member 211. The direction of the arrow A corresponds to a third direction orthogonal to the optical axis.

Each of the first guide-groove portions contacts or engages with the second ball to limit the relative movement of the guide member 210 and the rotation-preventing member 211 in a direction different from the direction of the arrow A.

In other words, each of the guide member 210 and the rotation-preventing member 211 has the first limit portion contacting the second ball to allow the relative movement of the guide member 210 and the rotation-preventing member 211 in the third direction accompanied by the rolling of the second ball and to limit the relative movement thereof in a direction different from the third direction with the second ball.

Reference numerals 213a and 213b show two third balls. The third balls 213a and 213b are placed in second limit portions formed in the rotation-preventing member 211 and the shift barrel 201.

Reference numerals 211A and 211B show second guide-groove portions that are formed at two positions of the rotation-preventing member 211 and serve as the abovementioned second limit portions. Reference numerals 201A and 201B show second guide-groove portions that are formed at two positions of the shift barrel 201 and serve as the above-mentioned second limit portions.

Each of the second guide-groove portions 211A and 211B formed in the rotation-preventing member 211 extends through the rotation-preventing member 211 and has the shape of an elongated groove extending in the direction of an arrow B. On the other hand, each of the second guide-groove portions 201A and 201B formed in the shift barrel 210 extends in the direction of the arrow B and has the same shape as that of the second guide-groove portion described in Embodiment 1. The second guide-groove portions 211A and 201A are opposed to each other in the optical axis direction, and the third ball 213a is placed therebetween. The second guide-groove portions 211B and 201B are opposed to each other in the optical axis direction, and the third ball 213b is placed therebetween.

The rotation-preventing member 211 is biased toward the shift barrel 201 by a biasing force from the second biasing member, later described, and the biasing forces allows the third ball to be sandwiched between the second guide-groove portions.

Each of the second guide-groove portions has such a length that the rotation-preventing member 211 and the shift barrel 201 are relatively moved in the direction of the arrow B while rolling the third ball. The end surfaces of the second guide-groove portion in the direction of the arrow B contact the third balls to limit the relative moving range of the rotation-preventing member 211 and the shift barrel 201 in that direction. The direction of the arrow B corresponds to a fourth direction orthogonal to the optical axis.

Each of the second guide-groove portions contacts or engages with the third ball to limit the relative movement of the rotation-preventing member 211 and the shift barrel 201 in a direction different from the direction of the arrow B.

In other words, each of the rotation-preventing member 211 and the shift barrel 201 has the second limit portion contacting the third ball to allow the relative movement of the rotation-preventing member 211 and the shift barrel 201 in the fourth direction accompanied by the rolling of the third ball and to limit the relative movement in a direction different from the fourth direction with the third ball.

In Embodiment 2, the third direction is identical to the first direction (pitch direction), while the fourth direction is identical to the second direction (yaw direction).

Reference numerals 214a, 214b, 214c, and 214d show guide springs serving as the second biasing members that bias the guide member 210 toward the shift barrel 201 in the optical axis direction.

The guide member 210 is positioned with respect to the base barrel 201 in the optical-axis-orthogonal plane by inserting positioning pins 202D and 202E provided in the base barrel 202 into a positioning hole 210d and a rotation-preventing elongated hole 210e provided in the guide member 210.

The guide springs 214a to 214d are formed of compression coil springs and have one ends contacting the bottom surfaces of holes formed in the base barrel 202 and the other ends contacting the guide member 210 to bias the guide member 210 toward the shift barrel 201 in the optical axis direction. The well-balanced placement of the guide springs 214a to 214d with respect to the second balls 212a and 212b and the third balls 213a and 213b can stably bias the guide member 210 and the rotation-preventing member 211 toward the shift barrel 201.

With the configuration described above, the rotation-preventing member 211 can be moved only in the direction of the arrow A with respect to the guide member 210, that is, the base barrel 202, and the shift barrel 201 can be moved only in the direction of the arrow B with respect to the rotation-preventing member 211. Therefore, the shift barrel 201 can be moved in parallel with (that is, can be moved parallel in) the optical-axis-orthogonal plane while the rotation thereof about the optical axis is limited (prevented).

The ball-reset operation as described in Embodiment 1 can be performed to guide the shift barrel 201 in all of the driving directions only by the ball rolling without backlash in active use, and any sliding friction is not produced, so that the driving responsivity is improved.

In Embodiment 2, since the shift barrel 201 is biased from the opposite sides in the optical axis direction by the shift spring 207 and the guide springs 214a to 214d, the biasing force of the shift spring 207 is set to be larger than the resultant of the biasing forces of the guide springs 214a to 214d.

Next, the configuration for detecting the position of the shift barrel 201 in Embodiment 2 will be described.

Reference numeral 215 shows a sensor holder that is fixed to the base barrel 202 with screws. Reference numeral 216 shows an iRED that serves as a light-emitting element and emits an infrared-light flux in the optical axis direction. The iRED 216 is fixed to the shift barrel 201 through bonding.

Reference numeral 217 shows a two-dimensional PSD that serves as a light-receiving element and is fixed to the sensor holder 215 through bonding. Reference numeral 201s shows a light-projecting window for the iRED 216 formed in the shift barrel 201.

Reference numeral 215s shows an aperture-stop window formed in the sensor holder 215. The infrared-light flux emitted from the iRED 216 is limited by the aperture-stop window 215s such that part of the light flux passes through the aperture-stop window 215s and is received by the two-dimensional PSD 217.

The iRED 216p and the light-projecting window 201s are provided for the movable shift barrel 201, while the aperture-stop window 215s and the two-dimensional PSD 217 are provided on the fixed sensor holder 215. When the shift barrel 210 is displaced in an arbitrary direction in the optical-axis-orthogonal plane from the central position of the movable range, the infrared-light flux emitted from the iRED 216 passes through the aperture-stop window 215s and is moved in the direction opposite to the moving direction of the shift barrel 201 on the two-dimensional PSD 217. Thus, an electric signal in accordance with the moving amount of the shift barrel 201 is provided by the two-dimensional PSD 217.

Figure 11:
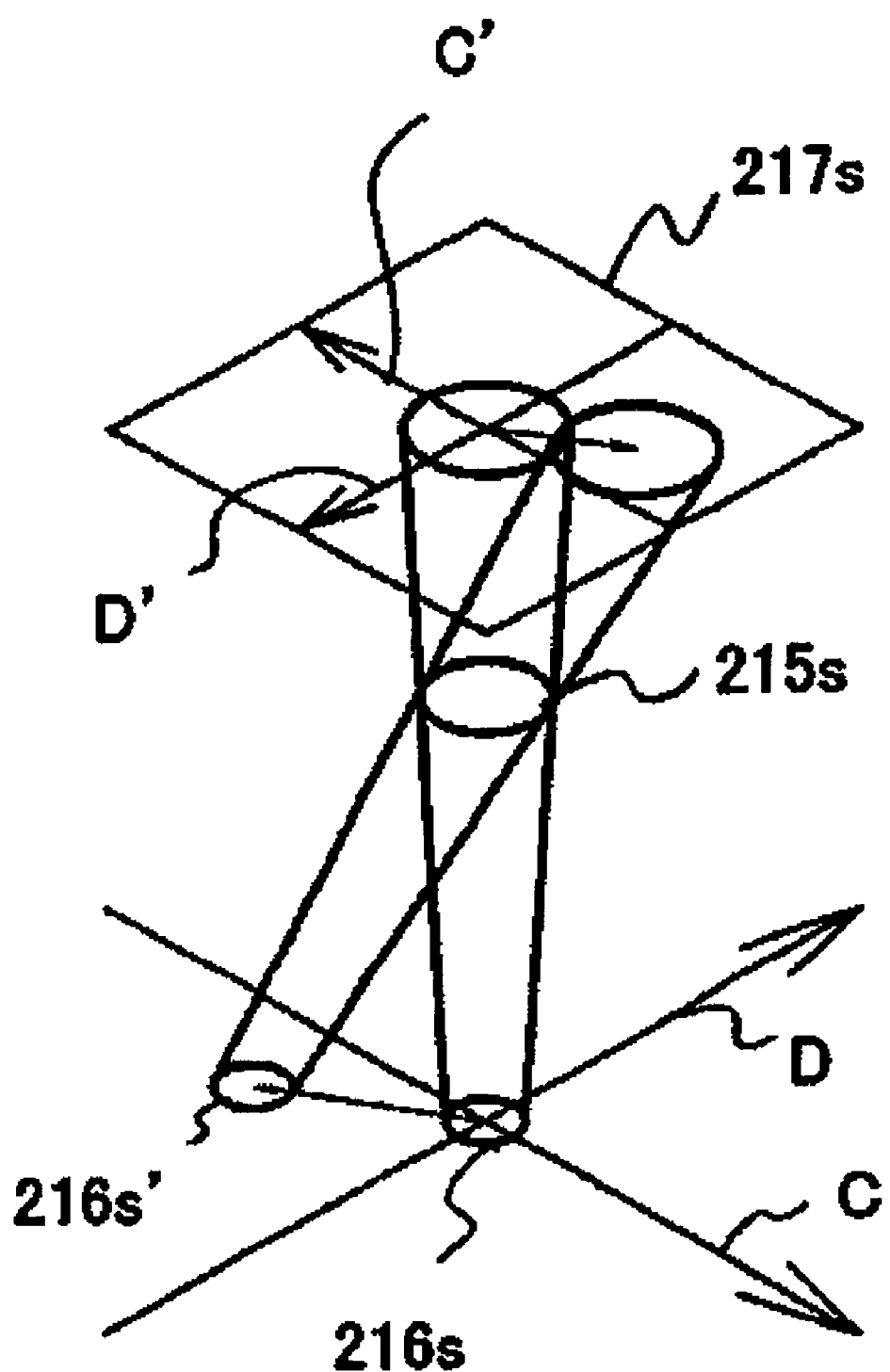
FIG. 11 is a schematic diagram showing the detection principles of a position detector mounted on the image-stabilization unit of Embodiment 1.

This will be described in more detail with reference to FIG. 11. FIG. 11 shows the relationship between a light-emitting portion 216s of the iRED 216, the aperture-stop window 215s, and a light-receiving portion 217s of the two-dimensional PSD 217. An arrow D corresponds to the pitch direction, while an arrow C corresponds to the yaw direction.

FIG. 11 shows that the light-receiving portion 216s is moved together with the shift barrel 201 from the position opposite to the intersection of two orthogonal detection axes D' and C' of the two-dimensional PSD 217 to a position 216s'. In this case, an infrared-light flux emitted from the light-emitting portion 216s, passing through the aperture-stop window 215s, and projected onto the light-receiving portion 217s is moved from the intersection of the detection axes D' and C' to the position at the distance proportional to the moving amount of the shift barrel 201. The light-receiving position in the D' and C' directions can be detected to provide the information on the moving amount of the shift barrel 210 in the pitch direction and yaw direction from the central position of the movable range.

In this manner, the iRED 216, the light-projecting window 201s, the aperture-stop window 215s, and the two-dimensional PSD 217 form the position detector.

The two-dimensional PSD can be used in Embodiment 2 since the rotation of the shift barrel 201 about the optical axis is limited (prevented) with little backlash. If any backlash is present, the shift barrel 210 and the iRED 216 fixed thereto are rotated accordingly. In this case, for example, although the iRED 216 is moved in the direction of the arrow D, almost no change occurs in the output from the two-dimensional PSD 217 in the direction of the detection axis D' and the output is changed in the direction of the detection axis C', with the result that it is impossible to detect the position of the shift barrel 201 accurately.

As described above, in Embodiment 2, the balls that can be rolled are used to allow the movement of the shift barrel 201 in the optical-axis-orthogonal plane while the displacement of the shift barrel 201 in the optical axis direction is prevented, and the balls that can be rolled are used to guide the parallel movement of the shift barrel 201 while the rotation of the shift barrel 201 is prevented. This can reduce the driving resistance of the shift barrel 201 to accurately control the position of the shift barrel 201 even when the shift barrel 201 is slightly driven. In other words, it is possible to realize the image-stabilization unit having the favorable image-stabilization performance.

Since the shift barrel 201 can be moved with reduced backlash, the image-stabilization operation can be performed with a lowered noise level. Position feedback control can be attained accurately even when the two-dimensional PSD described in Embodiment 2 is used or when the two position detectors described in Embodiment 1 are used at arbitrary positions.

In Embodiment 2, the shift barrel 201 is guided in the optical-axis-orthogonal plane by the first balls 209a to 209c sandwiched between the shift barrel 201 and the base barrel 202 serving as the fixed member in the lens apparatus. This can avoid reduced accuracy of position control of the shift barrel 201 even when the balls and the guide member 210 or the rotation-preventing member 211 for preventing the rotation of the shift barrel 201 are placed between the base barrel 202 and the shift barrel 201.

Embodiment 3

Figure 12:
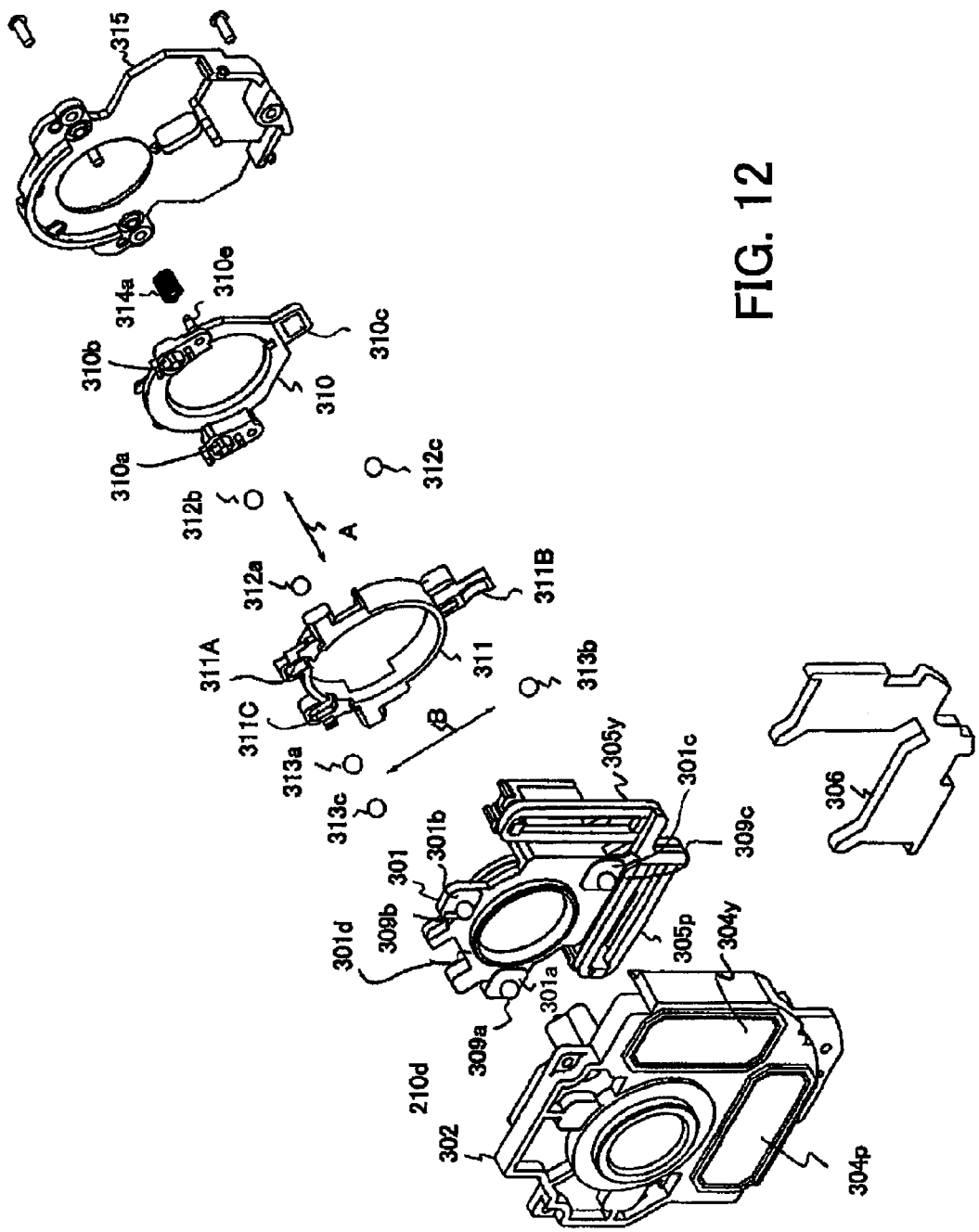
FIG. 12 is an exploded perspective view showing an image-stabilization unit that is a third embodiment (Embodiment 3) of the present invention.
Figure 13:
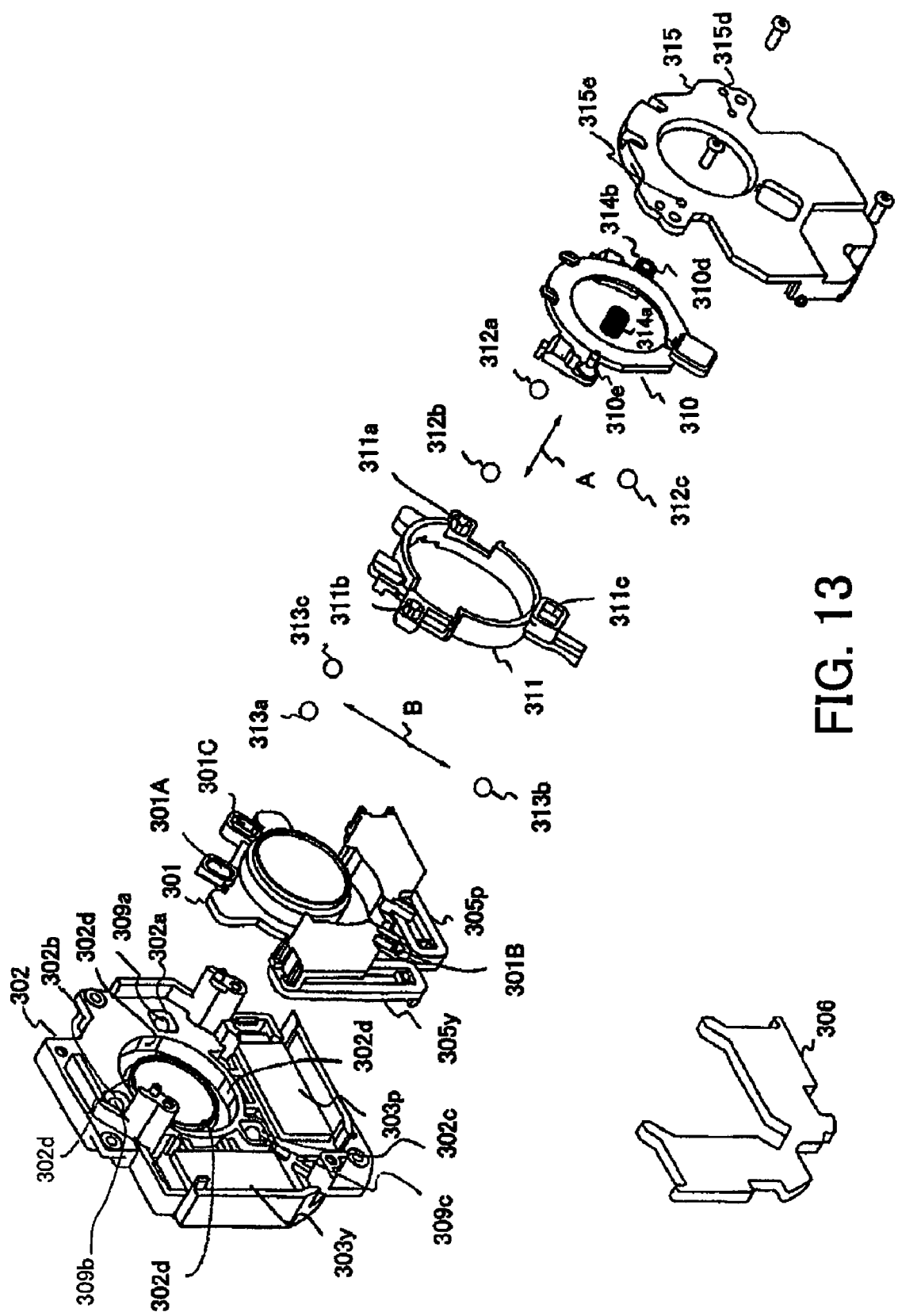
FIG. 13 is an exploded perspective view showing the image-stabilization unit of Embodiment 3.

FIGS. 12 and 13 show the configuration of an image-stabilization unit that is Embodiment 3 of the present invention. FIG. 12 is an exploded perspective view showing the image-stabilization unit when it is viewed from the front, and FIG. 13 is an exploded perspective view showing the image-stabilization unit when it is viewed from the back.

The image-stabilization unit of Embodiment 3 is a modification of the image-stabilization unit described in Embodiment 1 and has the same configurations for supporting a shift barrel 301 on a base barrel 302, for limiting the rotation of the shift barrel 301 about the optical axis, and for actuators as those in Embodiment 1. Thus, components and constituent portions identical to those in Embodiment 1 are designated with reference numerals having the same numbers in the two lower digits and having the number "3" in the first digit instead of "1" in Embodiment 1, and description thereof is omitted.

Embodiment 3 differs from Embodiment 1 in that Embodiment 3 has a returning mechanism that produces, by using balls, a returning force (hereinafter referred to as a center-returning force) to the central position of a movable range of each of a rotation-preventing member 311 and the shift barrel 301. Embodiment 3 also differs significantly from Embodiment 1 in that Embodiment 3 has no configuration for detecting the position of the shift barrel 301. An upper base 315 is used in Embodiment 3 instead of the sensor base 115 in Embodiment 1.

First, the returning mechanism will be described. In Embodiment 3, the center-returning force for the rotation-preventing member 311 is produced by appropriately forming the shapes of the bottom surface of a concave portion 311c and a surface 310c that are provided for the rotation-preventing member 311 and a surface 310c of a guide member 310, respectively, and sandwich a ball 312c therebetween. The center-returning force for the shift barrel 301 is produced by appropriately forming the shapes of second guide-groove portions (311A, 301A) and (311B, 301B) that are provided for the rotation-preventing member 311 and the shift barrel 301 and sandwich third balls 313a and 313b therebetween.

Figure 14A:
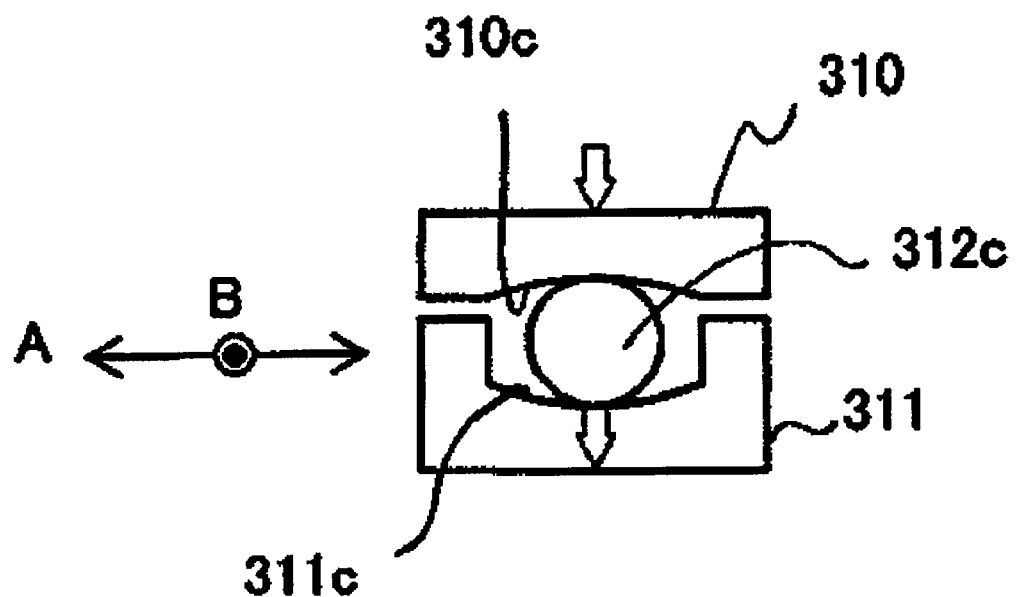
FIG. 14A is a section view showing the configuration of a returning mechanism included in the image-stabilization unit of Embodiment 3.
Figure 14B:
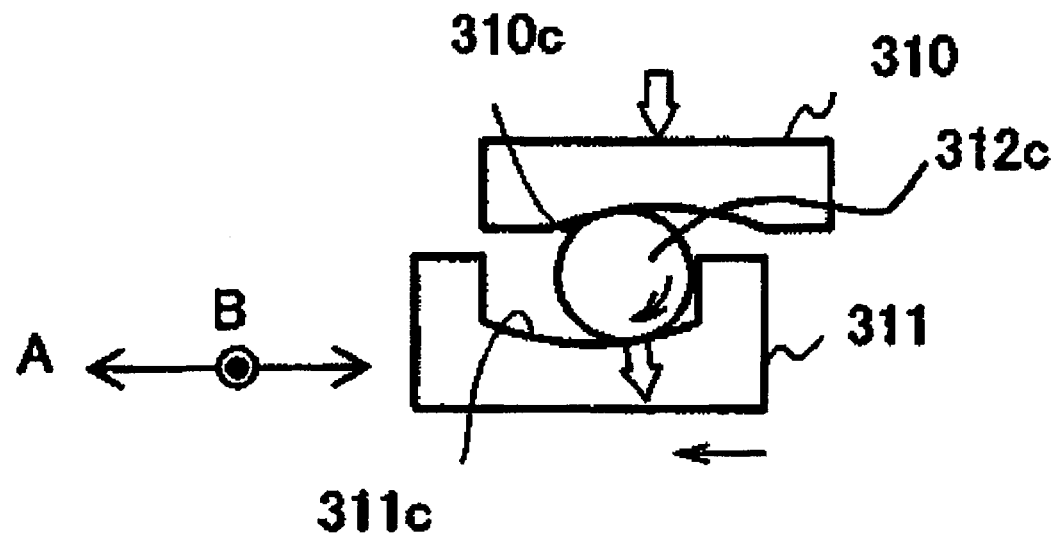
FIG. 14B is a section view showing the configuration of the returning mechanism included in the image-stabilization unit of Embodiment 3.

This will be described in detail with reference to FIGS. 14A and 14B. FIGS. 14A and 14B are section views showing the concave portion 311c and the surface 310c that sandwich the ball 312c therebetween along the direction of an arrow A.

FIG. 14A shows the rotation-preventing member 311 and the guide member 310 that are not relatively moved. The ball 312c is located at the center of the concave portion 311c and the surface 310c. The bottom surface of the concave portion 311c is formed as a curved surface concaved toward the surface 310c. On the other hand, the surface 310c is formed as a curved surface concaved toward the concave portion 311c.

In FIG. 14A, the surface 310c (guide member 310) undergoes biasing forces from guide springs 314a and 314b and pushes the bottom surface of the concave portion 311c (rotation-preventing member 311) downward via the ball 312c.

FIG. 14B shows the rotation-preventing member 311 displaced in the direction of the arrow A (to the left in FIG. 14B) from the state shown in FIG. 14A. During the transition from the state in FIG. 14A to the state in FIG. 14B, the ball 312c is rolled on the bottom surface of the concave portion 311c and the surface 310c since the surfaces are formed of the curved surfaces. In the state of FIG. 14B, the ball 312c applies a rightward force in accordance with the curvature of the bottom surface 311c, that is, the center-returning force, to the rotation-preventing member 311. As the curvature of the surface 311c is greater, the center-returning force is larger.

In this manner, the bottom surface of the concave portion 311c and the surface 310c are formed as the curved surfaces, that is, the surfaces inclined at angles continuously changed in accordance with the displacement amount of the rotation-preventing member 311. This can provide the rotation-preventing member 311 with the center-returning force proportional to the displacement amount of the rotation-preventing member 311.

The second guide-groove portions 311B and 301B provided for the rotation-preventing member 311 and the shift barrel 301, respectively, have the same shapes in the sections orthogonal to the direction of an arrow B as those described in Embodiment 1 with reference to FIG. 5A. However, they have the shapes as shown in FIGS. 14A and 14B in the sections along the direction of the arrow B. When the shift barrel 301 is moved in the direction of the arrow B with respect to the rotation-preventing member 311, the third ball 313b applies the center-returning force in accordance with the curvature of the second guide-groove portions 311B and 301B to the shift barrel 301. As the curvature is greater, the center-returning force is larger.

In this manner, the shape of the second guide-groove portions 311B and 301B is formed as the curved surfaces, that is, the surfaces inclined at angles continuously changed in accordance with the displacement amount of the shift barrel 301. This can provide the shift barrel 301 with the center-returning force proportional to the displacement amount of the shift barrel 301.

Since the abovementioned returning mechanism is provided, the position of the shift barrel 301 is determined by the driving forces produced by the first and second actuators. This allows so-called open control in which the position of the shift barrel 301 is controlled only by the values of electric currents input to the first and second actuators without detecting the position by a position detection circuit.

In Embodiment 3, the inclination angle of the surface with which the ball is contact is changed in view of the driving force of the actuator that is changed in accordance with the moving amount of the shift barrel 301. Thus, the favorable balance is achieved between the driving forces (input electric current values) of the actuators and the center-returning force to improve the accuracy in the position control of the shift barrel 301.

Figure 15:
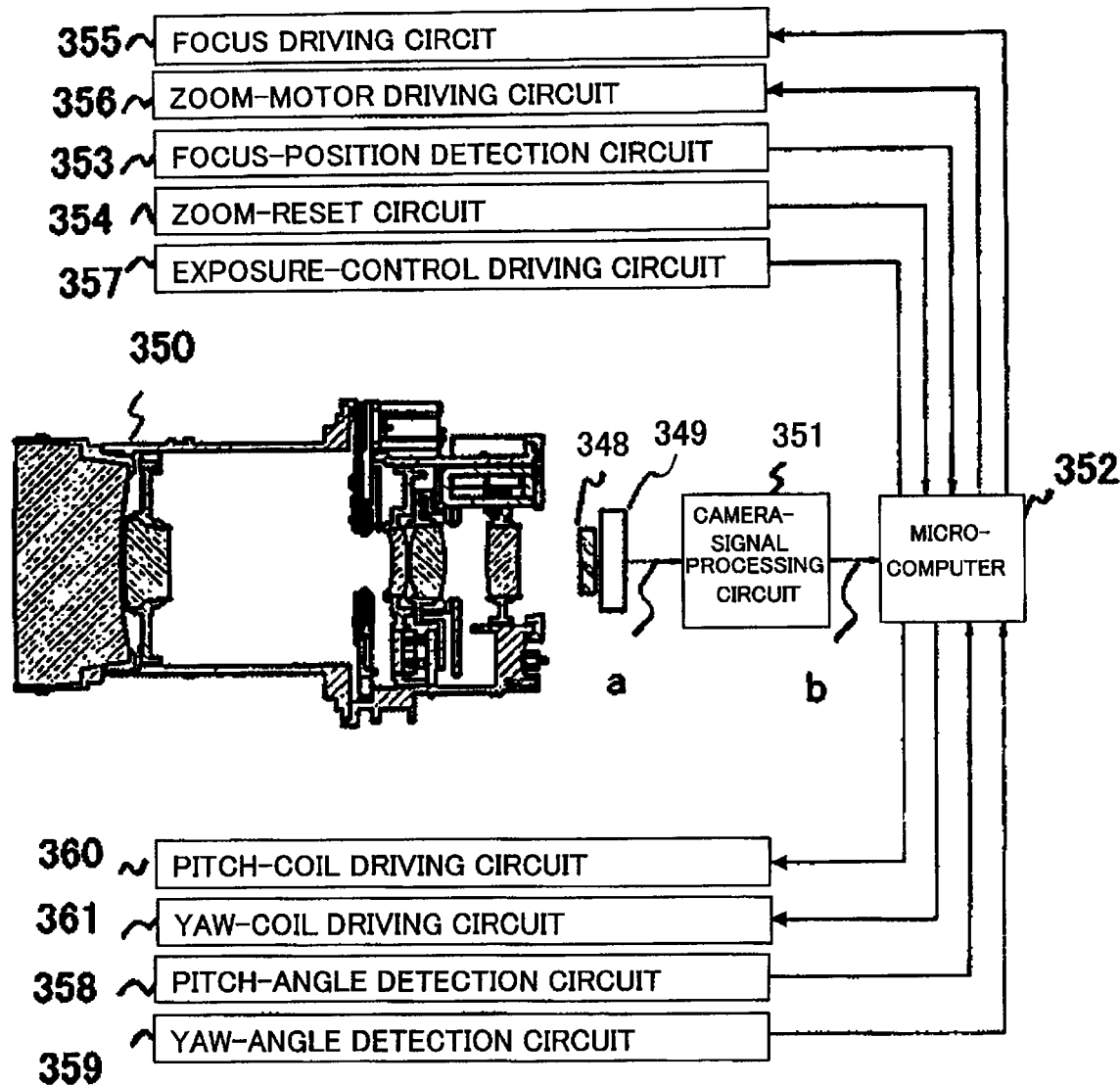
FIG. 15 is a block diagram showing the system configuration of a video camera including the lens apparatus according to Embodiment 3.

Next, FIG. 15 shows the configuration of a video camera on which a lens apparatus (lens barrel portion) including the image-stabilization unit of Embodiment 3 is mounted.

Since the image-stabilization unit has the abovementioned returning mechanism, the video camera does not require the position detection circuit described in Embodiment 1. A microcomputer 352 performs the open control for the image-stabilization unit.

The remaining configuration is identical to that of the video camera described in Embodiment 1. Thus, components identical to those in Embodiment 1 are designated with the same reference numerals or reference numerals having the same numbers in the two lower digits and having the number "3" in the first digit instead of "1" in Embodiment 1, and description thereof is omitted.

When the open control is performed for the image-stabilization unit, an error may be caused in the position of the shift barrel 301 depending on the magnitude or direction of the inertial force including the gravity acting on the video camera. To perform the position control for the shift barrel 301 more accurately, it is preferable to provide an acceleration sensor for the video camera to cancel the control error resulting from the inertial force.

The returning mechanism for the shift barrel 301 may be realized by a mechanism having a configuration other than that described in Embodiment 3.

Embodiment 4

Figure 16:
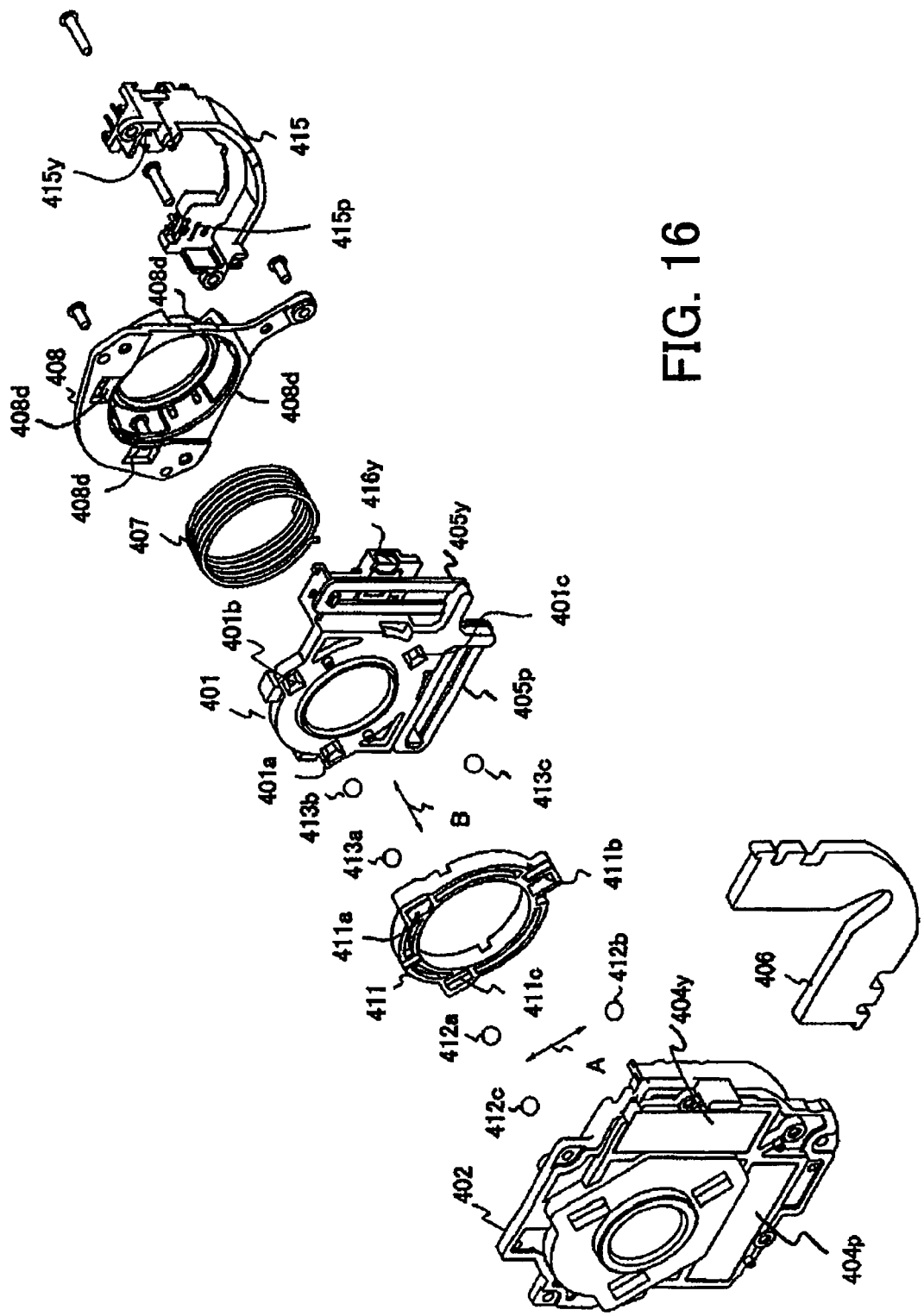
FIG. 16 is an exploded perspective view showing an image-stabilization unit that is a fourth embodiment (Embodiment 4) of the present invention.
Figure 17:
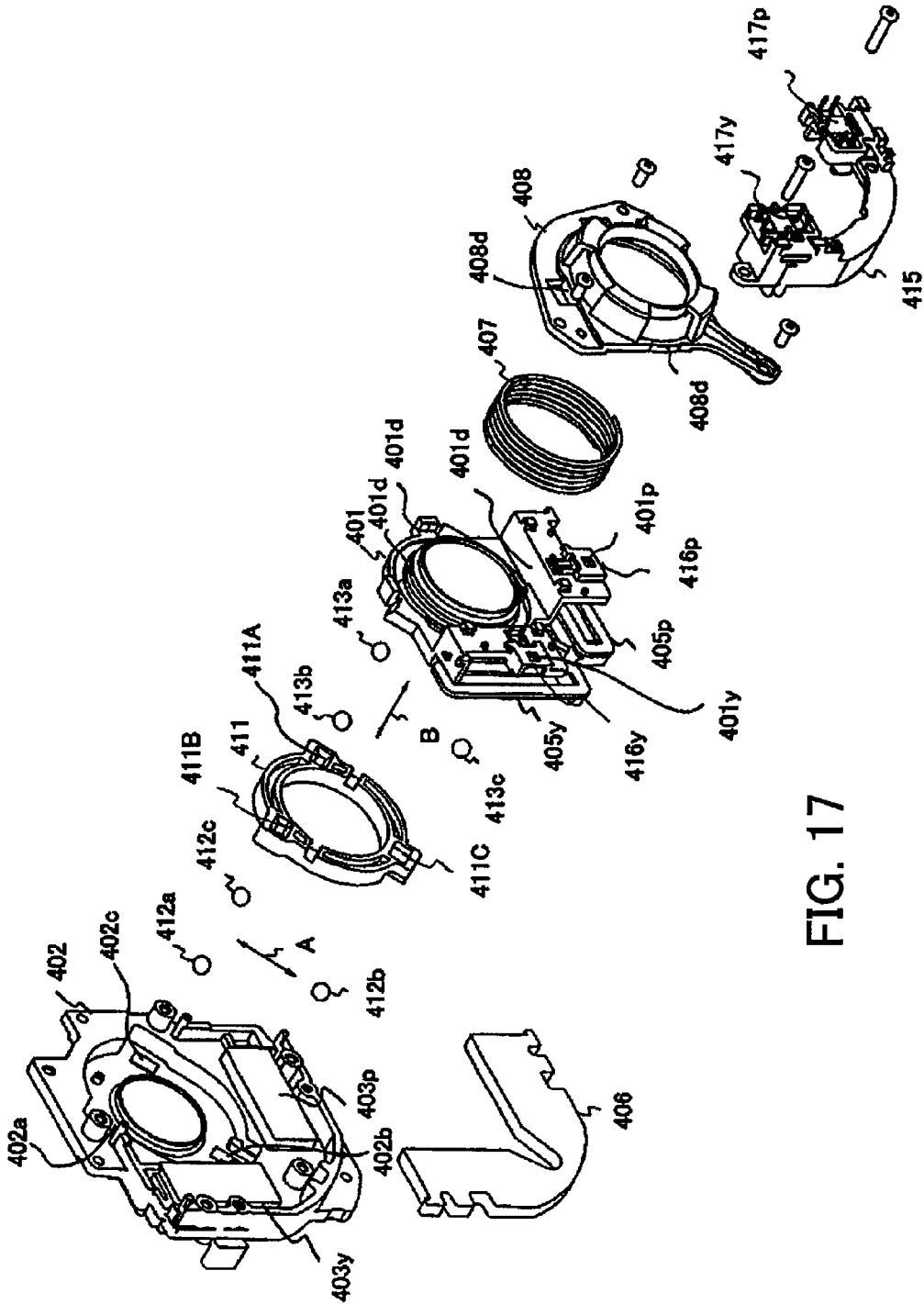
FIG. 17 is an exploded perspective view showing the image-stabilization unit of Embodiment 4.

FIGS. 16 and 17 show the configuration of an image-stabilization unit that is Embodiment 4 of the present invention. FIG. 16 is an exploded perspective view showing the image-stabilization unit when it is viewed from the front, and FIG. 17 is an exploded perspective view showing the image-stabilization unit when it is viewed from the back. The image-stabilization unit of Embodiment 4 is mounted on the lens apparatus shown in FIGS. 2 and 3, and the lens apparatus forms the lens barrel portion of the video camera shown in FIG. 7.

Reference numeral 401 shows a shift barrel serving as a lens-holding member that holds a correction lens L3$b$. Reference numeral 402 shows a base barrel that forms part of a base member and holds a front lens sub-unit L3$a$. In Embodiment 4, the base barrel 402 doubles as a first guide member.

Reference numeral 403$p$ shows a magnet polarized such that two half portions thereof divided in a vertical direction orthogonal to the optical axis have the S poles and the N poles arranged at opposite positions in the optical axis direction similarly to Embodiment 1. Reference numeral 404$p$ shows a lower yoke placed at the back of the magnet 403$p$ and forming part of a magnetic circuit. Reference numeral 405$p$ shows a driving coil placed to face the two magnetic poles formed in the upper and lower portions of the magnet 403$p$.

Reference numeral 406 shows an upper yoke that forms part of the magnetic circuit. The lower yoke 404$p$, the magnet 403$p$, and the upper yoke 406 are fixed to the base barrel 402 to form the magnetic circuit. The driving coil 405$p$ is fixed to the shift barrel 401 through bonding.

When an electric current is passed through the driving coil 405$b$, a magnetic flux in the magnetic circuit interferes with a magnetic flux produced by the driving magnet 405$p$ to cause the so-called Lorentz force that provides a driving force for the shift barrel 401 to drive the shift barrel 401 in a pitch direction. In other words, the lower yoke 404$p$, the magnet 403$p$, the driving coil 405$p$, and the upper yoke 406 constitute a first actuator that moves the shift barrel 401 (and thus the correction lens L3$b$) in the pitch direction. The pitch direction corresponds to a first direction.

A lower yoke 404$y$, a magnet 403$y$, a driving coil 405$y$, and the upper yoke 406 form a second actuator that moves the shift barrel 401 in a yaw direction. The yaw direction corresponds to a second direction.

Reference numeral 407 shows a shift spring serving as a first biasing member that biases the shift barrel 401 toward the base barrel 402. The shift spring 407 is a compression coil spring having one end that has an external diameter fitted inside a plurality of spring-holding portions 401$d$ formed around the correction lens L3$b$ in the shift barrel 401. Reference numeral 408 shows a spring holder that holds the other end of the shift spring 407 and is fixed to the base barrel 402 with screws.

Figure 18:
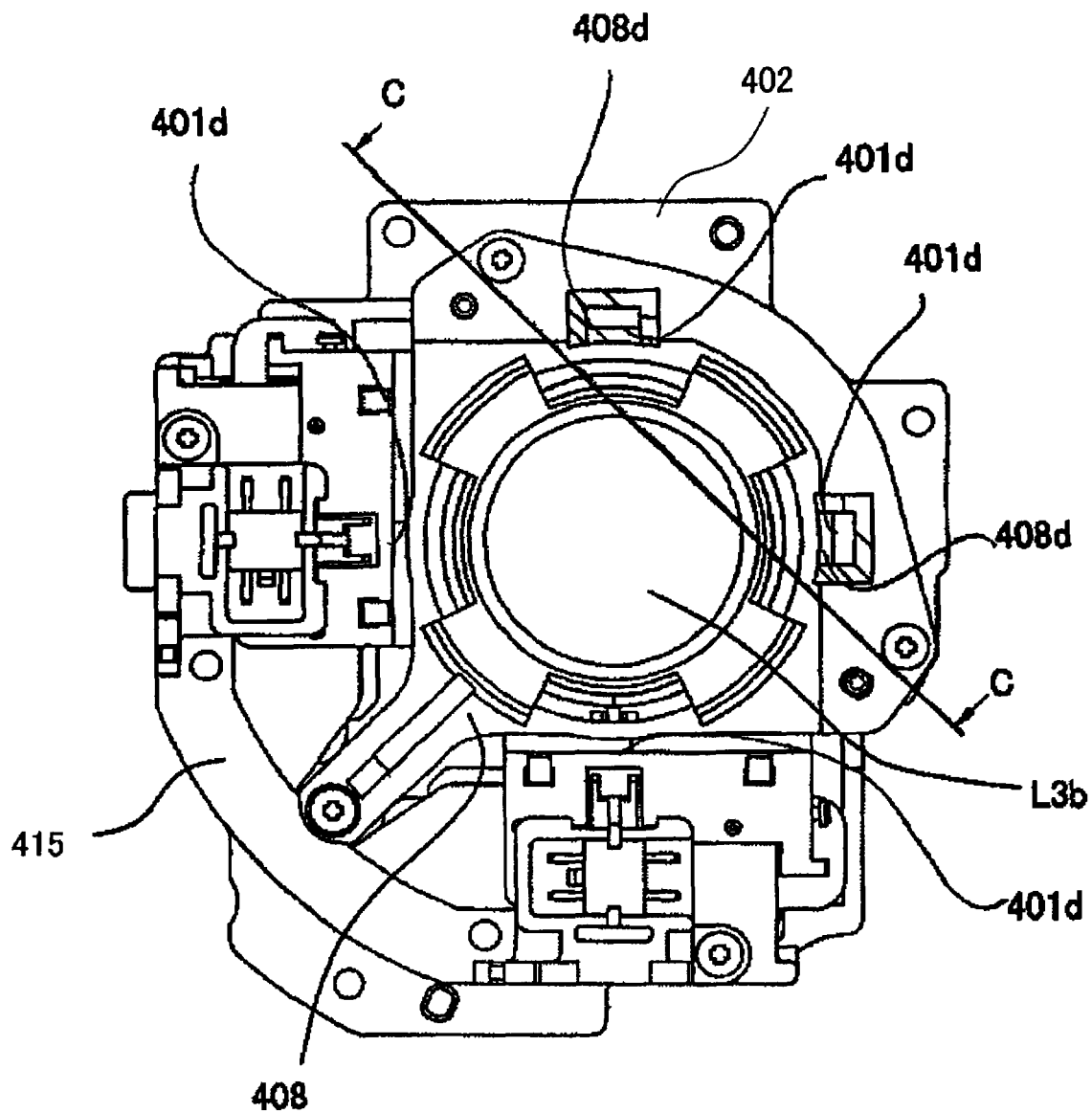
FIG. 18 is a rear view showing the image-stabilization unit of Embodiment 4.
Figure 19:
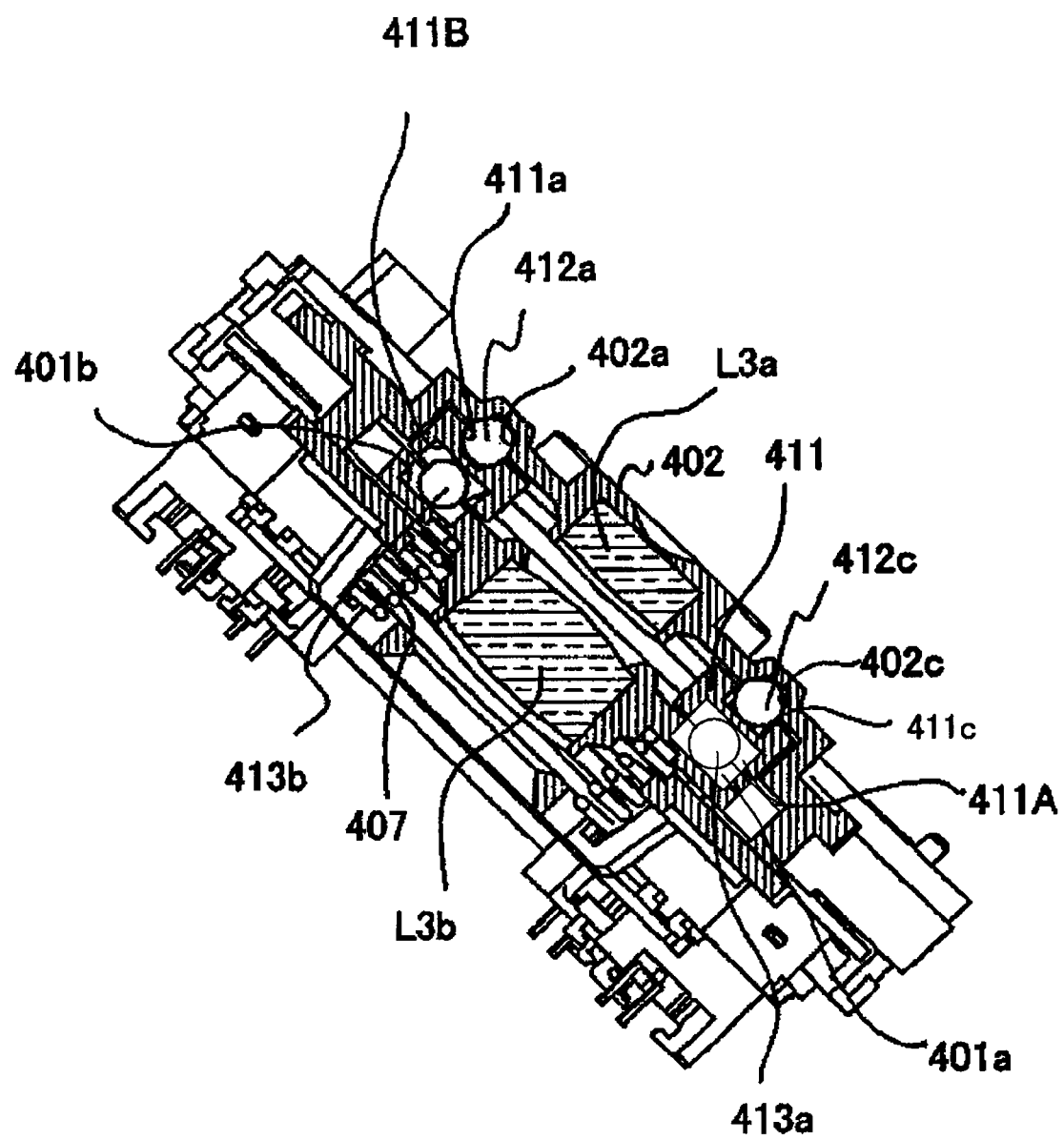
FIG. 19 is a section view showing the image-stabilization unit of Embodiment 4.

Next, description will be made of the configuration for supporting the shift barrel 401 on the base barrel 402 and the limit of the rotation of the shift barrel 401 about the optical axis with reference to FIGS. 16 to 19. FIG. 18 shows the image-stabilization unit when it is viewed from the back. FIG. 19 is a section view showing the image-stabilization unit taken along a C-C line shown in FIG. 18.

Reference numerals 402$a$, 402$b$, and 402$c$ show first guide-groove portions that are formed at three positions in the based barrel 402 doubling as the first guide member and serve as first limit portions. Reference numeral 412$a$ and 412$b$ show second balls placed in the first guide-groove portions 402$a$ and 402$b$.

Reference numeral 411 shows a rotation-preventing member serving as a second guide member. Reference numerals 411$a$ and 411$b$ show first guide-groove portions that are formed at two positions in the rotation-preventing member 411 and serve as the first limit portions. Reference numeral 411$c$ shows a concave portion having a flat bottom surface and formed in the rotation-preventing member 411.

The first guide-groove portions 402$a$, 402$b$, 402$c$, 411$a$, and 411$b$ have the same shapes as those of the first guide-groove portions described in Embodiment 1. The concave portion 411$c$ has the same shape as that of the concave portion 111$c$ described in Embodiment 1.

The second ball 412$a$ is placed in the space formed by the first guide-groove portions 402$a$ and 411$a$ opposite to each other in the optical axis direction. The second ball 412$b$ is placed in the space formed by the first guide-groove portions 402$b$ and 411$b$ opposite to each other in the optical axis direction. A ball 412$c$ is placed in the space formed by the first guide-groove portion 402$c$ of the shift barrel 401 and the concave portion 411$c$ of the rotation-preventing member 411 opposite to each other in the optical axis direction.

The rotation-preventing member 411 is biased toward the base barrel 402 under a biasing force from the shift spring 407 doubling as a second biasing member via the shift barrel 401. The biasing force causes the second balls 412$a$, 412$b$, and 412$c$ to be sandwiched between the first guide-groove portions 402$a$, 402$b$, 402$c$, 411$a$, 411$b$, and the concave portion 411$c$.

Each of the first guide-groove portions is formed to extend in the direction of an arrow A in FIGS. 16 and 17 and has such a length that the base barrel 402 doubling as the first guide member and the rotation-preventing member 411 are relatively moved in the direction of the arrow A while rolling the second ball. The end surfaces of the first guide-groove portion in the direction of the arrow A contact the second ball to limit the relative moving range of the base barrel 402 and the rotation-preventing member 411. The direction of the arrow A corresponds to a third direction orthogonal to the optical axis.

In addition, each of the first guide-groove portions contacts or engages with the second ball to limit the relative movement of the base barrel 402 and the rotation-preventing member 411 in a direction different from the direction of the arrow A.

In other words, each of the base barrel 402 and the rotation-preventing member 411 has the first limit portion contacting the second ball to allow the relative movement of the base barrel 402 and the rotation-preventing member 411 in the third direction accompanied by the rolling of the second ball and to limit the relative movement thereof in a direction different from the third direction with the second ball.

Reference numerals 401a, 401b, and 401c show second guide-groove portions that are formed at three positions of the shift barrel 401 and serve as second limit portions. Reference numerals 413a and 413b show third balls placed in the second guide-groove portions 401a and 401b. Reference numeral 413c shows a ball placed in the second guide-groove portion 401c.

Reference numerals 411A and 411B show second guide-groove portions that are formed at two positions of the rotation-preventing member 411 and serve as the second limit portions. Reference numeral 411C shows a concave portion having a flat bottom surface and formed in the rotation-preventing member 411.

The second guide-groove portions 401a, 401b, 401c, 411A, and 411B have the same shapes as those of the second guide-groove portions described in Embodiment 1. The concave portion 411C has the same shape as that of the concave portion 111C described in Embodiment 1.

The third ball 413a is placed in the space formed by the second guide-groove portions 411A and 401a opposite to each other. The third ball 413b is placed in the space formed by the second guide-groove portions 411B and 401b opposite to each other in the optical axis direction. The ball 413c is placed in the space formed by the second guide-groove portion 401c of the shift barrel 401 and the concave portion 411C of the rotation-preventing member 411 opposite to each other in the optical axis direction.

The shift barrel 401 undergoes a biasing force from the shift spring 407 serving as the first biasing member. The biasing force causes the third balls 413a and 413b and the ball 413c to be sandwiched between the second guide-groove portions 401a, 401b, 401c, 411A, 411B, and the concave portion 411C.

Each of the second guide-groove portions is formed to extend in the direction of an arrow B in FIGS. 16 and 17 and has such a length that the rotation-preventing member 411 and the shift barrel 401 are relatively moved in the direction of the arrow B while rolling the third ball. The end surfaces of the second guide-groove portion in the direction of the arrow B contact the third ball to limit the relative moving range of the rotation-preventing member 411 and the shift barrel 401 in that direction. The direction of the arrow B corresponds to a fourth direction orthogonal to the optical axis.

In addition, each of the second guide-groove portions contacts or engages with the third ball to limit the relative movement of the rotation-preventing member 411 and the shift barrel 401 in a direction different from the direction of the arrow B.

In other words, each of the rotation-preventing member 411 and the shift barrel 401 has the second limit portion contacting the third ball to allow the relative movement of the rotation-preventing member 411 and the shift barrel 401 in the fourth direction accompanied by the rolling of the third ball and to limit the relative movement thereof in a direction different from the fourth direction with the third ball.

The biasing force of the shift spring 407 acts on the shift barrel 401 and the rotation-preventing member 411 to pass through the triangle having the apexes at the three balls 412a to 412c and the triangle having the apexes at the balls 413a to 413c. This enables the rotation-preventing member 411 and the shift barrel 401 to be stably biased toward the base barrel 402.

In Embodiment 4, the rotation-preventing member 411 can be moved only in the direction of the arrow A with respect to the base barrel 402, and the shift barrel 401 can be moved only in the direction of the arrow B with respect to the rotation-preventing member 411.

Therefore, the shift barrel 401 can be moved in parallel with (that is, can be moved parallel in) the optical-axis-orthogonal plane while the rotation thereof about the optical axis is limited (prevented).

The mechanically maximum movable amount of the shift barrel 401 is determined such that a certain space is left between flat portions 401d of the shift barrel 401 that are formed in the pitch direction and yaw direction and a cylindrical portion 408d of the spring holder 408.

In Embodiment 4, the second balls 412a, 412b, the third balls 413a, 413b, and the balls 412c, 413c have the function of guiding the shift barrel 401 in the pitch and yaw directions in the optical-axis-orthogonal plane while limiting the displacement of the shift barrel 401 with respect to the base member 402 in the optical axis direction. In other words, the second balls 412a, 412b, the third balls 413a, 413b, and the balls 412c, 413c double as first balls.

Next, the configuration for detecting the position of the shift barrel 401 will be described. Reference numeral 415 shows a sensor holder that is fixed to the base barrel 402 with screws.

Reference numeral 416p shows an iRED that serves as a light-emitting element and emits an infrared-light flux in the optical axis direction. The iRED 416p is fixed to the shift barrel 401 through bonding. Reference numeral 417p shows a PSD that serves as a light-receiving element and is fixed to the sensor base 415 through bonding.

Reference numeral 401p shows a light-projecting window for the iRED 416p formed in the shift barrel 401. Reference numeral 415p shows a slit formed in the sensor base 415. The infrared-light flux emitted from the iRED 416p is limited by the slit 415p such that part of the light flux passes through the slit 415p and is received by the PSD 417p.

The position detector formed of the iRED 416p, the light-projecting window 401p, the slit 415p, and the PSD 417p performs position detection of the shift barrel 401 in the pitch direction based on the same principles as the detection principles described in Embodiment 1.

The position detector formed of an iRED 416y, a light-projecting window 401y, a slit 415y, and a PSD 417y performs position detection of the shift barrel 401 in the yaw direction based on the same principles as the detection principles in the pitch direction.

According to Embodiment 4, the similar effects to those in Embodiment 1 can be achieved. In addition, since the base member is used as the first guide member and the first and second biasing members are formed of the same member, the number of components can be reduced to realize the image-stabilization unit of a smaller size as compared with Embodiments 1 to 3.

As described above, according to Embodiments 1 to 4, the lens-holding member can be moved in an arbitrary direction in the optical-axis-orthogonal plane with reduced frictional resistance while the rotation of the lens-holding member about the optical axis is prevented. Therefore, the driving responsivity and the image stabilization performance can be improved to realize the optical image stabilizer with reduced vibrations and noise and the optical apparatus including the optical image stabilizer.

While several exemplary embodiments of the present invention have been described, the present invention is not limited to these embodiments and various variations and modifications may be made without departing from the scope of the present invention. For example, the numbers the first to third balls may be set to be numbers other than those described in Embodiments 1 to 4.

Furthermore, the present invention is not limited to these preferred embodiments and various variations and modifications may be made without departing from the scope of the present invention.

This application claims foreign priority benefits based on Japanese Patent Application No. 2007-017032, filed on Jan. 26, 2007, which is hereby incorporated by reference herein in its entirety as if fully set forth herein.

What is claimed is:

1. An optical image stabilizer comprising:
a base member;
a lens-holding member holding a lens and is movable in a plane orthogonal to an optical axis of the lens with respect to the base member;
a first actuator providing the lens-holding member with a driving force in a first direction;
a second actuator providing the lens-holding member with a driving force in a second direction, the first and second directions being orthogonal to the optical axis;
a first guide member placed between the base member and the lens-holding member in a direction of the optical axis and positioned with respect to the base member in the plane orthogonal to the optical axis;
a second guide member placed between the first guide member and the lens-holding member in the direction of the optical axis and movable in a direction orthogonal to the optical axis with respect to the base member;
a first ball placed between the base member and the lens-holding member in the direction of the optical axis and rolling in association with movement of the lens-holding member in the plane orthogonal to the optical axis with respect to the base member;
a second ball placed between the first guide member and the second guide member in the direction of the optical axis; and
a third ball placed between the second guide member and the lens-holding member in the direction of the optical axis,
wherein each of the first guide member and the second guide member includes a first limit portion that contacts the second ball such that relative movement of the first and second guide members in a third direction orthogonal to the optical axis accompanied by rolling of the second ball is allowed and that relative movement thereof in a direction different from the third direction is limited by the second ball, and
wherein each of the second guide member and the lens-holding member includes a second limit portion that contacts the third ball such that relative movement of the second guide member and the lens-holding member in a fourth direction orthogonal to the optical axis accompanied by rolling of the third ball is allowed and that relative movement thereof in a direction different from the fourth direction is limited by the third ball.

2. The optical image stabilizer according to claim 1, wherein the first limit portion contacts the second ball at at least two positions thereof in the direction in which the relative movement is limited, and
wherein the second limit portion contacts the third ball at least two positions thereof in the direction in which the relative movement is limited.

3. The optical image stabilizer according to claim 1, wherein the first ball contacts the base member and the lens-holding member.

4. The optical image stabilizer according to claim 1, wherein the third and fourth directions are different from the first and second directions.

5. The optical image stabilizer according to claim 1, further comprising:
a first biasing member biasing the lens-holding member toward the base member; and
a second biasing member biasing the first guide member toward the lens-holding member.

6. The optical image stabilizer according to claim 5, wherein the first biasing member doubles as the second biasing member, and
wherein the biasing member biases the first guide member, the second guide member, and the lens-holding member toward the base member.

7. The optical image stabilizer according to claim 1, further comprising a returning mechanism including a ball and a surface that contacts the ball to produce a force returning the lens-holding member toward the center of a movable range thereof.

8. An optical apparatus comprising:
the optical image stabilizer according to claim 1, and
an image-pickup element.

* * * * *